(12) United States Patent
Keller et al.

(10) Patent No.: US 7,501,111 B2
(45) Date of Patent: Mar. 10, 2009

(54) INCREASED CAPACITY SULFUR RECOVERY PLANT AND PROCESS FOR RECOVERING ELEMENTAL SULFUR

(75) Inventors: Alfred E. Keller, Ponca City, OK (US); Sriram Ramani, Katy, TX (US); Joe D. Allison, Ponca City, OK (US); Steven E. Lusk, Ponca City, OK (US); Nathan A. Hatcher, Ponca City, OK (US); Larry D. Swinney, Ponca City, OK (US); Rebecca S. Shaver, Newkirk, OK (US)

(73) Assignee: Conoco Phillips Company, Houston, TX (US)

( * ) Notice: Subject to any disclaimer, the term of this patent is extended or adjusted under 35 U.S.C. 154(b) by 226 days.

(21) Appl. No.: 11/467,453

(22) Filed: Aug. 25, 2006

(65) Prior Publication Data

US 2008/0050306 A1 Feb. 28, 2008

(51) Int. Cl.
*C01B 17/04* (2006.01)
*B01J 12/00* (2006.01)
*B01J 12/02* (2006.01)
*B01J 19/00* (2006.01)

(52) U.S. Cl. .............. 423/573.1; 423/574.1; 423/576.2; 423/DIG. 6; 422/129; 422/168; 422/169; 422/170; 422/177; 422/178; 422/187; 422/196; 422/197; 165/138; 165/186; 165/913

(58) Field of Classification Search .............. 423/573.1, 423/574.1, 576.2, DIG. 6; 422/129, 168, 422/169, 170, 177, 178, 187, 196, 197; 165/138, 165/186, 913
See application file for complete search history.

(56) References Cited

U.S. PATENT DOCUMENTS

| 1,930,716 | A |   | 10/1933 | Jaegar |
|---|---|---|---|---|
| 2,963,348 | A |   | 6/1957 | Sekkers |
| 3,393,050 | A | * | 7/1968 | Hunt et al. .................. 423/576 |
| 3,607,132 | A | * | 9/1971 | Sudduth ..................... 422/171 |
| 3,752,877 | A |   | 8/1973 | Beavon |
| 3,877,879 | A | * | 4/1975 | Palm et al. .................... 422/62 |
| 4,038,036 | A |   | 7/1977 | Beavon |
| 4,146,580 | A |   | 3/1979 | Beavon |

(Continued)

FOREIGN PATENT DOCUMENTS

RU            2023655       11/1994

(Continued)

OTHER PUBLICATIONS

Kohl, A.L., et al., "Gas Purification, Fourth Edition," Gulf Publishing Company, Library of Congress Cataloging in Publication Data, TP7545K6, 1985, 665.7, 85-4148, ISBN0-87201-314.6, 457-460.

(Continued)

*Primary Examiner*—Timothy C Vanoy

(57) ABSTRACT

Claus sulfur recovery plants that include one or more single-stage or multi-stage compact tubular Claus catalytic reactor-heat exchanger units are disclosed. In some instances, these new or improved Claus plants additionally include one or more compact heat exchanger containing cooling tubes that are filled with a heat transfer enhancement medium. The new compact tubular Claus catalytic reactor-heat exchanger units and HTEM-containing heat exchangers are also disclosed. A process for recovering sulfur from a hydrogen sulfide-containing gas stream, employing the new tubular Claus catalytic reactor-heat exchanger unit, and in some instances a HTEM-containing heat exchanger, are also disclosed.

23 Claims, 13 Drawing Sheets

U.S. PATENT DOCUMENTS

| | | |
|---|---|---|
| 4,197,277 A | 4/1980 | Sugier et al. |
| 4,219,445 A | 8/1980 | Finch |
| 4,233,276 A | 11/1980 | D'Souza et al. |
| 4,271,041 A | 6/1981 | Boudart |
| 4,279,882 A | 7/1981 | Beavon |
| 4,302,434 A | 11/1981 | Hellmer et al. |
| 4,311,683 A | 1/1982 | Hass et al. |
| 4,325,842 A | 4/1982 | Slaugh |
| 4,325,843 A | 4/1982 | Slaugh |
| 4,326,992 A | 4/1982 | Slaugh |
| 4,331,544 A | 5/1982 | Takaya |
| 4,406,873 A | 9/1983 | Beavon |
| 4,481,181 A | 11/1984 | Norman |
| 4,596,699 A | 6/1986 | Desgrandchamps |
| 4,632,043 A | 12/1986 | Pendergraft |
| 4,684,514 A | 8/1987 | Chen |
| 4,722,799 A | 2/1988 | Asbrook et al. |
| 4,797,268 A | 1/1989 | McGovern et al. |
| 4,814,159 A | 3/1989 | Voirin |
| 4,844,837 A | 7/1989 | Heck et al. |
| 4,863,707 A | 9/1989 | McShea, III et al. |
| 4,877,550 A | 10/1989 | Goetsch et al. |
| 4,886,649 A | 12/1989 | Ismagilov et al. |
| 4,889,701 A | 12/1989 | Jones et al. |
| 4,891,187 A | 1/1990 | Jungfer et al. |
| 4,988,494 A | 1/1991 | Lagas et al. |
| 5,039,503 A | 8/1991 | Sauvion et al. |
| 5,185,140 A | 2/1993 | Kvasnikoff et al. |
| 5,232,467 A | 8/1993 | Child et al. |
| 5,338,716 A | 8/1994 | Triplett |
| 5,384,301 A | 1/1995 | Flytzani-Stephanopoulos et al. |
| 5,397,556 A | 3/1995 | Towler et al. |
| 5,451,557 A | 9/1995 | Sherif |
| 5,458,808 A | 10/1995 | Suggitt et al. |
| 5,472,920 A | 12/1995 | Dubois et al. |
| 5,508,013 A | 4/1996 | Kvasnikoff et al. |
| 5,512,260 A | 4/1996 | Kiliany et al. |
| 5,573,991 A | 11/1996 | Sherif |
| 5,597,546 A | 1/1997 | Li et al. |
| 5,603,913 A | 2/1997 | Alkhazov |
| 5,628,977 A | 5/1997 | Heisel et al. |
| 5,639,929 A | 6/1997 | Bharadwaj et al. |
| 5,648,582 A | 7/1997 | Schmidt |
| 5,653,953 A | 8/1997 | Li et al. |
| 5,654,491 A | 8/1997 | Goetsch |
| 5,676,921 A | 10/1997 | Heisel et al. |
| 5,700,440 A | 12/1997 | Li |
| 5,720,901 A | 2/1998 | De Jong et al. |
| 5,807,410 A | 9/1998 | Borsboom |
| 5,814,293 A | 9/1998 | Terorde et al. |
| 5,891,415 A | 4/1999 | Alkhazov et al. |
| 5,897,850 A | 4/1999 | Borsboom |
| 5,965,100 A | 10/1999 | Khanmamedov |
| 5,985,178 A | 11/1999 | Long et al. |
| 6,017,507 A | 1/2000 | Nougayrede et al. |
| 6,083,471 A | 7/2000 | Philippe et al. |
| 6,099,819 A | 8/2000 | Srinivas et al. |
| 6,103,206 A | 8/2000 | Taylor, Jr. et al. |
| 6,103,773 A | 8/2000 | Wittenbrink et al. |
| 6,221,280 B1 | 4/2001 | Anumakonda et al. |
| 6,235,259 B1 | 5/2001 | Ledoux et al. |
| 6,372,193 B1 | 4/2002 | Ledoux et al. |
| 6,402,989 B1 | 6/2002 | Gaffney |
| 6,403,051 B1 | 6/2002 | Keller |
| 6,409,940 B1 | 6/2002 | Gaffney et al. |
| 6,447,745 B1 | 9/2002 | Feeley et al. |
| 6,488,838 B1 | 12/2002 | Tonkovich et al. |
| 6,497,812 B1 | 12/2002 | Schinski |
| 6,540,975 B2 | 4/2003 | Tonkovich et al. |
| 6,579,510 B2 | 6/2003 | Tonkovich et al. |
| 6,602,478 B2 | 8/2003 | Brundage |
| 6,616,909 B1 | 9/2003 | Tonkovich et al. |
| 6,726,850 B1 | 4/2004 | Reyes et al. |
| 6,776,974 B1 | 8/2004 | Burmaster et al. |
| 6,780,392 B2 | 8/2004 | Gross et al. |
| 6,800,269 B2 | 10/2004 | Keller |
| 6,890,498 B2 * | 5/2005 | Tsiava et al. ............ 423/220 |
| 6,946,111 B2 | 9/2005 | Keller et al. |
| 7,291,320 B2 * | 11/2007 | Geus et al. ............ 423/573.1 |
| 7,354,564 B2 * | 4/2008 | Graville et al. ......... 423/573.1 |
| 2001/0008619 A1 | 7/2001 | Geus et al. |
| 2002/0098145 A1 | 7/2002 | Borsboom et al. |
| 2002/0119091 A1 | 8/2002 | Keller |
| 2003/0129123 A1 | 7/2003 | Ramani et al. |
| 2003/0194366 A1 | 10/2003 | Srinivas et al. |
| 2005/0158235 A1 | 7/2005 | Ramani et al. |
| 2005/0180914 A1 | 8/2005 | Keller et al. |
| 2005/0201924 A1 | 9/2005 | Ramani et al. |
| 2006/0051275 A1 | 3/2006 | Ramani et al. |

FOREIGN PATENT DOCUMENTS

| | | |
|---|---|---|
| WO | WO9421358 | 9/1994 |
| WO | WO9719019 | 5/1997 |

OTHER PUBLICATIONS

Chao, J., "Properties of Elemental Sulfur," Hydrocarbon Processing, 217-223 (1980).

Chun, S.W., et al., "Selective Oxidation of H2S to Elemental Sulfur over TiO2/SiO2 Catalysts," Applied Catalysis B: Environmental 16, 235-243 (1998).

Clark, P.D., "Production of H2 from Catalytic Partial Oxidation of H2S in a Short-Contact-Time Reactor," Catalysis Communications 5:743-747 (2004).

Gamson, B.W., et al., "Sulfur from Hydrogen Sulfide," Chem. Eng. Prog. vol. 49, No. 4, 203-516 (Apr. 1953).

Goar, B.G., "Today's Sulfur Recovery Processes," Hydrocarbon Processing, vol. 47, No. 9, 248-252 (1968).

Goar, R.G., "First Recycle Selectox Unit on Stream," Oil & Gas Journal, 124-125 (1982).

Hass, R.H., et al., "Process Meets Sulfur Recovery Needs," Hydrocarbon Processing, 104-107 (1981).

Hickman, D.A., et al., "Production of Syngas by Direct Catalytic Oxidation of Methane," Science 259:343-346 (Jan. 15, 1993).

Hyne, J.B., "Methods for Desulfurization of Effluent Gas Streams," The Oil & Gas Journal, 64-78 (Aug. 28, 1972).

Ismagilov, Z.R., et al., "New Catalysts and Processes for Environmental Protection," React. Kinet. Catal. Lett., vol. 55, No. 2, 489-499 (1995).

Kerr, R.K., et al., "A New Sulfur-Recovery Process: The RSRP," Oil & Gas Journal, 230-243 (1982).

Kimtantas, C.L., "Modified Clause Sulfur Recovery Unit Equipment," Fundamentals of Sulfur Recovery, Presented at the 53rd Annual Lawrence Reid Gas Conditioning Conference, Feb. 23-26, 2003, pp. 73, 80-81. Univ. Oklahoma, Norman, OK.

Knight, W.P., "Improve Sulfur Condensers," Hydrocarbon Processing (May 1978), Gulf Publishing Co., Houston, Texas, vol. 57, No. 5, pp. 239-241.

Knight, W.P., "Evaluate Waste Heat Steam Generators," Hydrocarbon Processing (Jul. 1978), Gulf Publishing Co., Houston, Texas, pp. 126-130.

Lagas, J.A., et al., "Selective-Oxidation Catalyst Improves Claus Process," Oil & Gas Journal, 68-71 (1998).

Li, K.T., et al., "Catalytic Oxidation of Hydrogen Sulfide to Sulfur on Vanadium Antimonate," Ind. Eng. Chem. Res., 1480-1484 (1997).

M.E.D. Raymont, "Role of Hydrogen in Claus Plants," Hydrocarbon Processing, 177-179 (1975).

Taylor, H.A., et al., "The Decomposition of Hydrogen Sulphide," Journal of Physical Chemistry, vol. 31, 1212-1219 (1927).

Watson, R.W., et al., "The Successful Use of Oxygen in Claus Plants," HTI Quarterly: Winter 1995/1996, 95-101.

* cited by examiner

INCREASED CAPACITY SULFUR RECOVERY PLANT AND PROCESS FOR RECOVERING ELEMENTAL SULFUR

BACKGROUND OF THE INVENTION

1. Technical Field of the Invention

The present invention generally relates to methods and apparatus for recovering elemental sulfur from hydrogen sulfide-containing gas streams, and more particularly to such methods and apparatus that increase the sulfur recovery capacity of new or existing Claus plants and reduce the size and complexity of such plants.

2. Description of Related Art

Large quantities of $H_2S$-containing gases are commonly produced in the petrochemical industry by amine treating units and sour water stripping units. Claus sulfur recovery plants ("Claus plants") are in widespread use to convert this environmentally hazardous $H_2S$ to useful elemental sulfur by oxidation according to the overall or net equation $$H_2S + \tfrac{1}{2}O_2 \rightarrow 1/xS_x + H_2O \quad (1)$$

wherein x=2, 6 or 8, depending on the particular conditions of temperature and pressure. The net production of elemental sulfur is usually accomplished as a series of process steps carried out according to a conventional plant flow scheme. First, a free flame combustion step takes place by burning ⅓ of the $H_2S$ in a free flame combustion chamber or burner according to the equation $$H_2S + \tfrac{3}{2}O_2 \rightarrow SO_2 + H_2O \quad (2).$$

Oxygen for the combustion stage is usually supplied by air from an air compressor or blower. The combustion stage is followed by the "Claus" stage, in which the "Claus reaction" takes place according to the equation $$2H_2S + SO_2 \leftrightarrow 3/xS_x + 2H_2O \quad (3)$$

wherein x=2, 6 or 8, depending on the particular conditions of temperature and pressure. The Claus reaction initially takes place in the reaction furnace immediately following the burner, and while the gases are at near-flame temperatures. After the gases exit the reaction furnace they are cooled in a heat exchanger, usually with boiling water circulating in the heat exchanger and being converted to medium to high-pressure steam. After cooling, the gases are cooled further in another heat exchanger (sulfur condenser), in which boiling water is circulated to make low pressure steam. At this stage in the process about 50-70% of the incoming $H_2S$ will typically have been converted to elemental sulfur. The actual amount depends on such factors as inlet $H_2S$ concentration, flame temperature, residence time in the reaction furnace following the burner, and the presence and amount of other chemicals such as other combustibles or carbon dioxide. Condensed liquid sulfur product is usually recovered at this point in the process.

A 70% level of conversion is insufficient by today's standards to allow the effluent from the Claus furnace to be emitted to the atmosphere or to make tail gas treatment economical at this point. An increase in the overall level of conversion is usually achieved by removing one of the reaction products from the mixture (e.g., by condensing and removing liquid elemental sulfur), and then allowing the remaining gases to continue reacting until equilibrium is reached (Equation 3). After the reaction furnace, the reacted gases are cooled in a heat exchanger against boiling water. The gases can be cooled to allow condensation of sulfur in this heat exchanger, or, more typically, the cooled gases from the heat exchanger are further cooled in a separate heat exchanger/sulfur condenser to facilitate condensation of the sulfur formed in the first reaction stage.

In modified Claus plants, further recovery of sulfur is accomplished by taking the gases from the first condenser, reheating, and then passing the gases over a high surface area Claus catalyst in a packed bed reactor. The Claus reaction (Equation 3) takes place on the catalyst up to the equilibrium limit of the reaction. Some well-known Claus catalysts are bauxite, alumina and titania The Claus catalytic reactors are normally operated in the gas phase to prevent condensed sulfur from plugging the pores of the catalyst. To enhance recovery of sulfur via the Claus reaction, the elemental sulfur is conventionally removed by condensation in a sulfur condenser which follows the catalytic reactor. Similar reheat, reaction and condensation steps are commonly repeated two to three times in order to maximize sulfur yield of the plant. Because of the equilibrium restraints inherent in the Claus reaction (Equation 3), adding more catalytic Claus reactors becomes ineffective beyond a total of three or four units, so other measures must be taken in order to further increase sulfur recovery beyond about 98 vol. % of the initial $H_2S$ and to complete the recovery of the remaining sulfur before the effluent is released to the atmosphere.

The addition of equipment needed to improve recovery almost invariably decreases the capacity of the plant by adding resistance to flow from additional friction. Thus the addition of each catalytic Claus reactor, heater, condenser and tail gas treatment unit is accompanied by a reduction in operating pressure. Moreover, as demand for sulfur recovery capacity grows in an existing facility, the flows of $O_2$-containing gas and $H_2S$-containing gas into the Claus plant will increase. This increase in flow causes an increase in pressure drop through the system approximated by the relationship $$DP_2/DP_1 = (Q_2/Q_1)^2 \quad (4)$$

where DP is pressure drop, Q is volumetric flow rate, 1 is the initial flow condition, and 2 is the new flow condition. In any given system, at a certain flow rate of $H_2S$-containing gas the pressure drop due to friction from flow will exceed the available pressure drop through the unit. At that point, the unit is capacity constrained. Conventional Claus plants operate at low pressure, usually 20-30 psia at the front of the plant. In almost every case, a conventional sulfur recovery plant with a burner, reaction furnace, single catalytic Claus reactor, and single tail gas treatment unit is limited to 5 to 15 psi of available pressure drop. Many existing Claus plants suffer from a severe constraint in capacity.

Cost efficient ways to meet the ever increasing need for greater sulfur recovery capacity are sought. U.S. Pat. No. 6,776,974 (Monsanto Enviro-Chem Systems, Inc.) describes some proposed solutions that are intended to decrease the size and increase the capacity of Claus installations. Some approaches involve combusting the tail gas to oxidize the residual sulfur species to sulfur dioxide, and then recovering and recycling the resulting concentrated stream of sulfur dioxide to a point upstream of the Claus unit. Another approach includes contacting an acid gas feed stream and sulfur dioxide with a Claus conversion catalyst in a single Claus catalytic reaction zone to form elemental sulfur and water. A drawback of the latter approach is that the $SO_2$ feed must provided in addition to the $H_2S$ feed. This is usually done by burning sulfur or $H_2S$, which necessitates a reaction furnace and possibly a waste heat boiler. Another downside of directly contacting a Claus conversion catalyst with the acid gas feed stream is that serious negative consequences can result when the H₂S stream contains certain additional components. In the case of hydrocarbon and ammonia contaminants, for example, incomplete destruction of ammonia and incomplete combustion of hydrocarbon typically occur, leading to ammonia salt plugging, and sooting (coke deposition).

Another avenue for expanding sulfur recovery plant capacity is to increase the available pressure drop for the above-described increased friction losses that can occur due to greater flow. This is accomplished by raising the air blower discharge pressure, increasing the operating pressure of the source that provides the H₂S-containing gas (e.g., amine regenerator or sour water stripper), or increasing the pressure holding capacity of the sulfur liquid seal devices. The difficulty of replacing underground sulfur sealing devices and the poor operation of feed-producing units at higher pressure usually limits the gains that can be realized from this latter approach.

Still another way to increase plant capacity is to reduce the overall flow of fluid by using molecular oxygen instead of air in the combustion stage. Elimination of the nitrogen component of air reduces the total flow per unit volume of H₂S-containing gas and allows more H₂S to be processed for the same pressure drop limitation. The economic appeal of oxygen enrichment is limited by the cost of the oxygen, the temperatures attained in an O₂-enriched flame, and by the cost of the special equipment needed to handle high concentrations of oxygen.

Efforts to redesign the system for low pressure drop have generally met with little success, since each piece of equipment must be designed for low pressure drop and the total number of pieces of equipment in a Claus Plant, there is only a small amount of pressure drop available for the entire plant. The design of the heat exchanger that follows the reaction furnace is a major factor in the plant's overall performance. Key parameters in the design of waste heat exchangers have been previously discussed by W. P. Knight ("Evaluate waste heat steam generators," *Hydrocarbon Processing*, July 1978, Gulf Publishing Co., Houston, Tex., pp. 126-130). Because the gases in the process are corrosive to carbon steel under typical conditions, the tube walls must be kept close to the temperature of the boiling water on the shell side of the exchanger to prevent rapid corrosion and loss of containment on the tube side. Thus, a favorable heat transfer coefficient is necessary. A low heat transfer coefficient prompts an increase in the heat exchange areas in the design, usually by lengthening the tubes of the heat exchanger, with an associated increase in pressure drop due to the increased friction from the longer tubes. One concern when using longer tubes is that elemental sulfur can form tenacious deposits that can plug equipment, if allowed to solidify within the system. While greater shell diameters and an increased number of tubes could be used to overcome the pressure drop restriction, those remedies tend to greatly increase the cost of heat exchanger construction compared to merely lengthening the existing number of tubes. The larger diameters and limits on tube mass velocities generally lead to undesirably low heat transfer coefficients. These and other considerations have tended to lead heat exchanger designers toward larger diameter tubes than is customary in most petrochemical plant heat exchanger services, for instance.

There are also design concerns with respect to the sulfur condensers, including such factors as velocity of the sulfur bearing gas stream, fogging, heat transfer, tube selection, mechanical design, and arrangement (W. P. Knight, "Improve sulfur condensers," *Hydrocarbon Processing*, May 1978, Gulf Publishing Co., Houston, Tex., vol. 57 (No. 5) pp. 239-241; Laurance Reid, *Gas Conditioning Conference Fundamentals—Sulfur Recovery*, 2003, Norman, OK, p. 80-81.) The paradigm of present day sulfur condenser design generally includes: (1) controlling the overall heat transfer coefficient between 8 and 18 BTU/hr/ft²/° F.; (2) controlling the mass velocity in the tube below 6.1 lbm/ft²/sec and greater than about 2 lbm/ft²/sec; (3) sloping the tubes toward the outlet at approximately ⅛ inch drop per foot of length; and (4) avoiding vertical or absolutely horizontal tubes. Following those guidelines will deter loss of elemental sulfur from the condenser, by mechanisms of entrainment and fogging, to subsequent reaction stages, and thereby improves the overall efficiency of a Claus unit. The efficiency of any sulfur condenser is inherently limited by the properties of elemental sulfur. In order for sulfur to condense from the vapor phase to the liquid phase, the sulfur in the vapor phase must be in equilibrium with sulfur in the liquid phase.

Designing a higher-capacity Claus plant is also complicated by the size and number of Claus catalytic reaction units that are customarily used today, each including a sulfur condenser with coolant system, reheater, and Claus conversion catalyst. Typical Claus catalyst beds are designed and industry data shows they are typically operated in a range of gas hourly space velocity (GHSV) of about 1000 h⁻¹ to about 1500 h⁻¹. The GHSV is usually represented at standard cubic feet/hour of incoming gases to the reactor divided by the cubic feet of catalyst in the reactor. The nominal design GHSV of a Claus catalytic reactor can make the catalyst volume requirements quite large. To reduce the frictional pressure loss through such a large bed, the catalyst bed is usually designed with large cross-sectional area and short catalyst depth, compared to other fixed bed catalytic reaction systems.

It is also important in the design of a Claus sulfur recovery plant to remove heat from the process gases after each reaction step. The design of the waste heat exchanger or boiler following the burner/furnace (thermal) zone and the subsequent sulfur condensers of a conventional sulfur recovery plant is a major factor in the overall performance of a sulfur plant. A generally accepted design principle for waste heat boilers is to control the heat flux through the tube wall below about 30,000 BTU/hr/ft². This recommended level prevents overheating the tube by keeping the outside of the tube wall wetted with water. Combining the design elements of multiple reheat, reaction and condensation stages with the GHSV requirements for a typical Claus reactor leads to very large, expensive units.

There remains a pressing need for improvement of existing Claus sulfur recovery plants, and for new, higher-capacity, compact installations, in order to meet the increasing burden of handling greater volumes of more concentrated acid gas streams. At the same time, there is also a necessity to limit construction costs and operating expenses of new and existing Claus sulfur recovery plants. There is also a need for more productive sulfur recovery processes that can meet the ever more stringent standards for release of residual sulfur compounds into the environment.

SUMMARY OF THE INVENTION

New Claus sulfur recovery plants and improved existing Claus installations are disclosed which contain one or more compact tubular Claus reactor-heat exchanger unit (sometimes referred to herein as the "tubular Claus catalytic reactor" or simply "TClaus reactor"). In some instances, these new or modified Claus plants are additionally improved by including one or more compact heat exchangers comprising cooling tubes that are filled with a heat transfer enhancement medium. Methods of using the new or modified Claus plants, Claus catalytic reactors, heat exchangers and sulfur condensers, are also disclosed. Various embodiments of the present invention make it possible to overcome many of the drawbacks that are inherent in many sulfur recovery plants and processes for recovering sulfur from $H_2S$-containing gases by providing apparatus or methods for increasing the sulfur recovery capacity of new and existing Claus operations. New high-capacity modified Claus plants and methods of constructing and operating such plants at lower cost than conventional sulfur recovery installations are now made possible.

In some embodiments, the tubular reactor comprises a single catalytic stage, and in other embodiments the tubular Claus reactor is a "multi-pass" or multi-stage unit comprising multiple Claus catalyst beds. The chemistry and structural form of the catalyst is such that the catalyst promotes the Claus reaction. In some embodiments, conventional Claus catalysts such as alumina or titania are employed in the new TClaus reactors. In some embodiments, the TClaus reactor comprises three concentric tubes, including a perforated inner tube defining an interior gas channel, a perforated middle tube, a solid outer tube, a catalytic reaction zone disposed between the inner and middle tubes, and a sulfur condensation zone between the middle and outer tubes. An integral heat exchanger encloses the concentric tube assembly.

In accordance with some embodiments of the present invention a compact, high efficiency heat exchanger, such as a waste heat exchanger or sulfur condenser having cooling tubes filled with a heat transfer enhancement medium (HTEM), is provided. In certain embodiments, the HTEM-containing heat exchanger is included in an above-described new or modified Claus plant as a way to further increase the capacity of the plant and to reduce its overall size.

In accordance with certain embodiments of the present invention, a tubular Claus catalytic reaction unit for converting $SO_2$ and $H_2S$ to elemental sulfur and water is provided. This reaction unit generally comprises: a sulfur separator comprising a reactant gas channel or a process gas channel, the sulfur separator having a liquid sulfur outlet and at least one liquid sulfur inlet, the process gas channel having a process gas outlet; at least one concentric tubular reactor assembly disposed between the reactant gas channel and the process gas channel. The concentric tubular assembly comprises: an annular Claus catalytic reaction zone in fluid communication with the reactant gas channel, an annular sulfur condensation zone adjacent to and in fluid communication with the catalytic reaction zone, for receiving reacted gases from the reaction zone and for condensing and collecting sulfur, the condensation zone comprising a process gas outlet in fluid communication with the process gas channel and the sulfur separator. The tubular Claus catalytic reaction unit also comprises a temperature control zone in thermal communication with the condensation zone.

In some embodiments of the above-described unit, each concentric tubular reactor assembly comprises: first and second ends; a group of concentric tubes extending between the first and second ends. The concentric tubes comprise a perforated inner tube having an interior gas channel, a perforated middle tube, and a non-perforated outer tube, wherein the annular catalytic reaction zone is disposed between the inner and middle tubes. The annular sulfur condensation zone is disposed between the middle and outer tubes, the condensation zone having at least one liquid sulfur outlet and a process gas outlet. The reactant gas channel adjoins the first end, is in fluid communication with the interior channel, and the process gas channel adjoins the second end, is in fluid communication with the sulfur condensation zone, and comprises at least one process gas outlet. The temperature control zone comprises: a first end adjacent to the reactant gas channel, a second end adjacent to the process gas channel, a shell comprising an interior fluid space surrounding at least a portion of each the outer tube, a heat transfer fluid inlet, and a heat transfer fluid outlet.

In certain embodiments, the reaction unit is configured in a vertical orientation with respect to the axis of the concentric tubes. In certain embodiments, the reaction unit is configured in a horizontal orientation with respect to the axis of the concentric tubes. In certain embodiments, each reactor assembly comprises a removable closure attached to the inner and middle tubes at each reactor assembly's second end.

In some embodiments, an above-described reaction unit comprises a plurality of the concentric tubular reactor assemblies, wherein the reactant gas channel comprises a first reactant gas channel, the process gas channel comprises a third process gas channel having a process gas outlet, and the unit comprises at least a first pair of the concentric tube assemblies configured for receiving reactant gas from the first reactant gas channel and emitting process gas into a first process gas channel that is adjacent to the third process gas channel. In some embodiments, the unit further comprises at least a second pair of concentric tube assemblies configured for receiving process gas from the first process gas channel and for emitting process gas into a second process gas channel that is adjacent to the first reactant gas channel and comprises a liquid sulfur outlet. In some embodiments, the unit further comprises at least a third pair of concentric tube assemblies configured for receiving process gas from the second process gas channel and for emitting process gas into the third process gas channel.

A Claus sulfur recovery plant is also provided in accordance with certain embodiments of the present invention. This sulfur recovery plant comprises: a thermal zone for producing a gaseous effluent comprising elemental sulfur, $SO_2$ and unreacted $H_2S$; at least one heat exchanger; and at least one tubular Claus catalytic reaction unit, as described above, for receiving the gaseous effluent and converting $SO_2$ and unreacted $H_2S$ to elemental sulfur and water, wherein a first heat exchanger is disposed between the thermal zone and one the tubular Claus catalytic reaction unit, for partially cooling the gaseous effluent from the thermal zone.

In certain embodiments of the above-described sulfur recovery plant, the at least one heat exchanger includes a first heat exchanger comprising: a plurality of tubes, wherein each the tube contains a heat transfer enhancement medium, a liquid sulfur outlet, and a process gas outlet in fluid communication with the tubular Claus catalytic reaction unit.

In some embodiments of an above-described sulfur recovery plant, the heat exchanger containing the heat transfer enhancement medium has a heat transfer coefficient at least 5 fold greater than the heat transfer coefficient of an identical heat exchanger without the heat transfer enhancement medium.

In certain embodiments of an above-described sulfur recovery plant, at least one heat exchanger comprises a second heat exchanger consisting of a sulfur condenser which includes a liquid sulfur outlet and a plurality of tubes containing heat transfer enhancement medium.

In still another embodiment of the present invention, an improvement is provided to a Claus sulfur recovery plant which includes a thermal zone followed by a waste heat exchanger containing a plurality of cooling tubes, and at least one Claus catalytic reaction unit in series flow arrangement with the waste heat exchanger, each Claus catalytic reaction unit comprising a heater, Claus catalytic reactor and sulfur condenser. This improvement comprises (a) insertion of the tubular Claus catalytic reaction unit as described above in parallel flow arrangement with the at least one Claus catalytic reaction unit; and/or (b) replacement of at least one Claus catalytic reaction unit with at least one above-described tubular Claus catalytic reaction unit.

Further improvements to a sulfur recovery plant are provided by employing one or more HTEM-containing heat exchanger to lower the heat exchange area requirement and/ or to provide improved sulfur coalescence on HTEM over a wider mass velocity operating range. For example, HTEM in the reaction furnace waste heat boiler allows for a shorter or smaller diameter boiler by reducing the heat transfer area required. In a conventional Claus reactor assembly, the use of HTEM in each sulfur condenser allows for reducing the heat transfer area of the outer tube and helps coalesce the sulfur condensed to prevent having aerosol or entrained sulfur leave that stage of the assembly. This in turn, improves the performance of a subsequent Claus catalyst bed.

Accordingly, another embodiment of the present invention provides a heat exchanger for a sulfur recovery plant, comprising: at least one cooling tube having an interior and exterior, wherein the interior contains a heat transfer enhancement medium; a cooling zone surrounding the tube exterior; a process gas inlet; a process gas outlet; and a liquid sulfur outlet, wherein the process gas inlet and outlet, and the sulfur outlet are in fluid communication with the tube interior. In some embodiments the heat exchanger has a heat transfer coefficient at least 5 fold greater than the heat transfer coefficient of an identical heat exchanger without the heat transfer enhancement medium. The heat transfer enhancement medium is additional to the structure of the tube, itself, and any heat transfer property of the tube alone.

Also provided, in accordance with certain embodiments of the present invention, is a process for recovering elemental sulfur from a feed gas stream containing hydrogen sulfide and sulfur dioxide using one of the above-described new or improved Claus plants. In various embodiments in which the TClaus reactor replaces a conventional Claus reactor unit, the TClaus reactor is operated in series flow. For example, the process comprises: (a) introducing a feed gas stream comprising hydrogen sulfide and sulfur dioxide into an above-described Claus catalytic reaction unit; (b) circulating a heat transfer fluid in the temperature control zone to maintain the temperature of the heat transfer fluid in the range of about 125° C. to about 157° C.; (c) contacting the feed gas stream with the Claus catalyst in the catalytic reaction zone, causing the hydrogen sulfide and sulfur dioxide to react, forming a process gas stream comprising elemental sulfur and water; and (d) cooling the process gas stream to cause the condensation of at least a portion of the elemental sulfur in the process gas stream, whereby, aided by the force of gravity, liquid sulfur collects in the sulfur condensation zone and seep into the reactant gas channel by way of the plurality of liquid sulfur outlets. A hydrogen sulfide and sulfur dioxide-containing reactant gas flows into the interior gas channel, the Claus reaction produces elemental sulfur which condenses along the inner wall of the outer tube, and collects in a reactant gas channel.

In certain embodiments of the process, in step (b), circulating the heat transfer fluid in the temperature control zone comprises maintaining the temperature of the process gas stream from step (c) in the range of about 125° C. to about 157° C.

In certain embodiments, the TClaus reactor is configured in parallel with a group of conventional Claus catalytic reactor units, and the feed gas stream is split. A portion of the stream is processed in the TClaus reactor and the remainder is processed in the serially arranged group of different Claus catalytic units (e.g., conventional Claus catalytic units).

In certain embodiments of an above-described process, the Claus catalytic reaction unit is a multi-stage Claus catalytic reaction unit in which the reactant gas channel comprises a first reactant gas channel, the process gas channel comprises a third process gas channel having a process gas outlet, and the reaction unit comprises: at least a first group of the concentric tubular reactor assemblies configured for receiving reactant gas from the first reactant gas channel and emitting process gas into a first process gas channel that is adjacent to the third process gas channel, at least a second group of concentric tubular reactor assemblies configured for receiving process gas from the first process gas channel and for emitting process gas into a second process gas channel that is adjacent to the first reactant gas channel and comprises a liquid sulfur outlet, and at least a third group of concentric tubular reactor assemblies configured for receiving process gas from the second process gas channel and for emitting process gas into the third process gas channel. In accordance with this embodiment, step (a) comprises: ($a_1$) passing the feed gas stream into the at least a first group of concentric tubular reactor assemblies, whereby a first reacted gas mixture comprising elemental sulfur, unreacted $H_2S$ and unreacted $SO_2$ is formed and a first quantity of elemental sulfur is condensed, and the resulting first stage process gas is emitted into the first process gas channel; ($a_2$) passing the first process gas into the at least a second group of concentric tubular reactor assemblies, whereby a second reacted gas mixture comprising elemental sulfur, unreacted $H_2S$ and unreacted $SO_2$ is formed and a second quantity of elemental sulfur is condensed, and the resulting second stage process gas is emitted into the second process gas channel; ($a_3$) passing the second process gas into the at least a third group of concentric tubular reactor assemblies, whereby a third reacted gas mixture comprising elemental sulfur, unreacted $H_2S$ and unreacted $SO_2$ is formed and a third quantity of elemental sulfur is condensed, and the resulting third stage process gas is emitted into the third process gas channel; and ($a_4$) collecting the condensed sulfur.

In some embodiments of an above-described process, in step (b), circulating the heat transfer fluid in the temperature control zone comprises contacting each non-perforated outer tube of each reactor assembly in the multi-stage Claus catalytic reaction unit with the heat transfer fluid.

In some embodiments of an above-described process, step (d) comprises cooling the first, second and third process gas streams from steps ($a_1$-$a_3$) in the respective sulfur condensation zones, causing liquid sulfur to collect in the respective sulfur condensation zones.

In some embodiments of an above-described process, the heat transfer fluid inlet is disposed nearer to the last group of concentric tubular reactor assemblies than to the other or earlier (preceding) groups of reactor assemblies, the interior fluid space comprises a baffle disposed between the last group of reactor assemblies and the earlier groups of reactor assemblies, and the heat transfer fluid comprises water, and step (d) further comprises introducing pressurized water into the fluid inlet, wherein the pressurized water is at a temperature in the range of about 100-125° C., to cool the process gas and condensed sulfur from the last group of reactor assemblies to a lower temperature than that of the process gas and condensed sulfur from the earlier reactor assemblies, whereby the overall sulfur recovery of the process is enhanced.

In accordance with certain embodiments of the present invention, a process for recovering elemental sulfur from a gas stream containing hydrogen sulfide is provided which includes a thermal stage that comprises passing a feed gas stream comprising hydrogen sulfide and an $O_2$-containing gas through a Claus burner/furnace, or passing the feed gas stream through a catalytic partial oxidation reactor, to yield a process gas stream comprising elemental sulfur, water, $SO_2$, and unreacted $H_2S$, if any; partially cooling the process gas stream; introducing at least a first portion of the partially cooled oxidized gas stream into an above-described tubular Claus catalytic reaction unit, circulating the heat transfer fluid in the temperature control zone at a temperature or temperature range that maintains the temperature of the gases at about the dew point of sulfur, whereby liquid sulfur forms in each the sulfur condensation zone and a second process gas stream is produced. Some embodiments of this process further comprise introducing a second portion of the partially cooled process gas stream into a first sulfur condenser, whereby additional liquid sulfur is formed and a third process gas stream is produced; subjecting the third process gas stream sequentially to at least one other Claus catalytic reaction unit, different than an above-described Claus catalytic reaction unit, wherein each other Claus catalytic reaction unit comprises a heater, Claus catalytic reactor, and sulfur condenser, thereby forming additional liquid sulfur and producing a fourth process gas stream. The process further comprises recovering the liquid sulfur; combining the second and fourth process gas streams; and subjecting the combined process gas stream to a tail gas treatment to remove residual sulfur-containing compounds, and thereby producing an exhaust gas. In certain embodiments, at least one sulfur condenser comprises a plurality of cooling tubes containing a heat transfer enhancement medium. In some embodiments, the thermal stage of the process comprises passing the feed gas stream through a short contact time catalytic partial oxidation reactor at a gas hourly space velocity of at least 20,000 $h^{-1}$, wherein the short contact time reactor comprises a mixing zone, a reaction zone, and a cooling zone.

A compact, tubular Claus catalytic reactor-heat exchanger combination unit offers advantages over most other ways that are currently used to expand the total capacity of a new or existing Claus sulfur recovery plant. Employing a new TClaus reactor, as described herein, requires minimal new equipment. In some instances, its use can eliminate altogether the need for construction of a new plant. Use of a new TClaus reactor does not require revision of the liquid sulfur seal devices on the existing unit. Using the new reactor generally does not require raising the operating pressure of the feed-producing units. A process that employs the new catalytic Claus reactor does not require the substitution of costly oxygen for air. With the new catalytic Claus reactor, alloy construction for oxygen transport lines and instruments is not necessary. Additionally, when the new catalytic Claus reactor is employed, it does not affect the free flame combustion chamber temperature. As a result, the need for temperature moderation for high level $O_2$ (typically 30%) in the combined air/oxygen stream is eliminated. These and other embodiments, features and advantages of the present invention will become apparent with reference to the following description and drawings.

DETAILED DESCRIPTION OF THE PREFERRED EMBODIMENTS

Figure 1A:
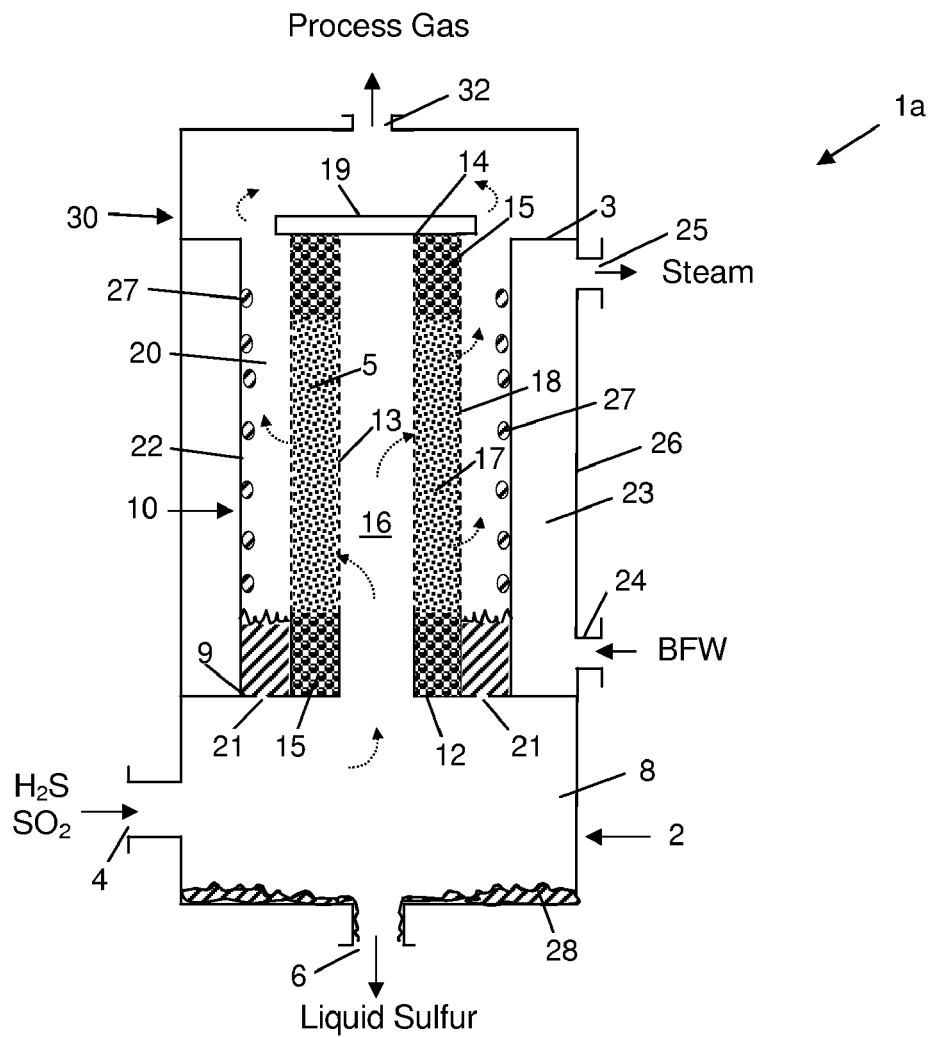
FIG. 1A is a longitudinal cross-section view of a vertically oriented compact tubular Claus catalytic reactor-heat exchanger combined unit (tubular Claus catalytic reaction unit) in accordance with an embodiment of the present invention.

An improved Claus sulfur recovery plant contains one or more single-stage or multi-stage compact tubular Claus catalytic reactor units. These new or improved Claus plants may be additionally improved by inclusion of one or more compact heat exchangers containing cooling tubes that are filled with a heat transfer enhancement medium.

Compact, Tubular Claus Catalytic Reactor Units.

Toward decreasing the cost and complexity of the catalytic section of a Claus sulfur recovery plant, a study of the kinetics of the Claus reaction (Equation 3) was conducted, and the experimental data is shown in Table 1. Various parameters that were computed from the data are listed in Table 2, including estimated catalyst volumes required in each stage of a Claus plant in order to produce about 108 long tons per day (LTPD) of sulfur. From this study it was determined that the catalyst volumes actually required are much smaller than the conventionally designed volumes, e.g., about 434 cu ft of catalyst per stage of a typical Claus plant in use today. These calculations were then confirmed by examining the temperature profiles of conventional Claus catalyst beds from a test run of a 108 LTPD plant that is currently in industrial use. In the field study, duplicate thermocouples were placed at predetermined depths in the catalyst bed and temperature measurements were taken at defined intervals during a sulfur recovery operation. The resulting data are shown in Table 3. It was observed that the maximum temperature rise caused by heat release from the Claus reaction was usually reached by the second set of thermocouples ("Top-Mid" for Converters 1 and 2, "Bottom" for Converter 3") located at certain points within the catalyst bed. It was concluded that the reaction had reached equilibrium, and that the presence of additional catalyst in the remainder of the catalyst bed provided no further formation of sulfur.

I. Single-Stage Tubular Claus Catalytic Reactor.

A. Vertical Orientation—Upward Flow. Applying the aforesaid discovery, a vertically oriented tubular Claus reactor unit of reduced or compact size, compared to conventional Claus reactors, was devised for use in the Claus catalytic section of a sulfur recovery plant utilizing the rapid reaction kinetics determined in the above-described experiments. In general, the unit comprises a combined sulfur separator/feed gas channel, a process gas outlet channel, and a heat exchanger disposed therebetween. The heat exchanger shell encloses three concentric tubes which comprise the Claus reactor. All or a portion of the inner tube is perforated in a regular manner to allow evenly distributed gas flow from the inside cylinder into the first annulus. All or a portion of the middle tube is also perforated in a regular manner to allow gas containing the products of the Claus reaction to pass through to the outer annulus. The outer tube is a solid walled (non-perforated) tube for containing the process gas on the inside and keeping boiling water, or other heat transfer fluid, on the outside. The term "perforated in a regular manner" means that each uniform perforation is spaced apart an approximately equal distance from each adjacent perforation, or the perforations are arranged in a predetermined pattern. For ease of reference in this disclosure, the term "perforated tube" refers to either a tube in which an entire surface is perforated or a tube in which a portion is perforated and a portion is unperforated, except where it may be specifically indicated to the contrary.

A representative vertically oriented tubular Claus catalytic reaction unit 1, shown in FIG. 1A, comprises a compact tubular reactor and heat exchanger combination. More specifically, reactor unit 1 comprises a combination feed gas channel/sulfur separator 2, a product gas channel 30, and a vertically oriented tubular assembly 10 disposed therebetween, inside heat exchange shell space 23. Assembly 10 comprises an upstream end 12 and a downstream end 14 with three vertically oriented concentric tubes 13, 18 and 22 disposed therebetween. Between tubes 13 and 18 is first annulus 17. Between tubes 18 and 22 is second or outer annulus 20. A cross-sectional view of assembly 10 is shown in FIG. 1A, taken across end 12. Inside the first or innermost tube 13 of assembly 10 is channel 16. Tube 13 is perforated to allow evenly distributed gas flow from inside channel 16 into the first annulus 17, as described in more detail below. Annulus 17 contains a predetermined volume of Claus catalyst 5, which is bounded at the upstream and downstream ends 12, 14 by support material 15, which is preferably refractory and preferably catalytically inert. In some embodiments the support material may have at least some beneficial catalytic activity (e.g., activity for catalyzing the Claus reaction). The primary purpose of the support material is to prevent catalyst settling during operation of the reactor. In circumstances in which catalyst settling is not an issue, annulus 17 may be entirely filled with Claus catalyst. Tubes 13 and 18 (and annulus 17) terminate at end 14 and are closed by cap 19. Cap 19 may be either fixed or removable for ease of replacement of catalyst 5 and support material 15.

Figure 1B:
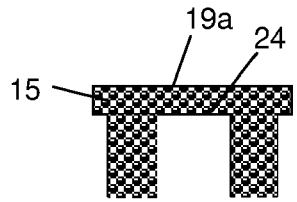
FIG. 1B is a cutaway view of an embodiment of the downstream end of a tube assembly having a cap that contains support material, as may be employed in the unit of FIG. 1A.

Referring still to FIG. 1A, channel 16 is open at upstream end 12, and closed at downstream end 14 by cap 19. A layer of support material 15 also fills a portion of first annulus 17 between the catalyst 5 and upstream end 12. A layer of similar support material 15 also fills a portion of annulus 17 between the catalyst 5 and downstream end 14. As depicted in FIG. 1B, an alternative to the cap 19 shown in FIG. 1A is shown. At downstream end 14 cap 19a of channel 16 contains an interior space 24 that is filled with support material 15 and is in fluid communication with annulus 17 at end 14. A portion of channel 16 is in fluid flow communication with first annulus 17 by way of perforations in tube 13. Preferably the perforations are regularly spaced along the portion of tube 13 that contacts the catalyst 5. Second tube 18 is also in fluid flow communication with first annulus 17 by way of perforations in tube 18, which are preferably regularly spaced along the portion of tube 18 that contacts the catalyst 5. Preferably the upstream portions of first and second tubes 13 and 18 that contain the support material 15 are not perforated.

The third or outer tube 22 has a solid (non-perforated) wall for containing process gas in second annulus 20 and for excluding boiling water or another heat exchange fluid that is circulated in the shell space 23 of the Claus reaction unit 1a, when it is used for recovering sulfur from an $H_2S$-containing gas stream, as described in more detail below. A tube sheet or shell 26 surrounds outer tube 22, which together with tube sheets 3 and 9 define the shell space 23. Tube sheet 26 has an inlet 24 and an outlet 25 for respectively introducing and removing a heat exchange fluid such as boiling water/steam.

Figure 1C:
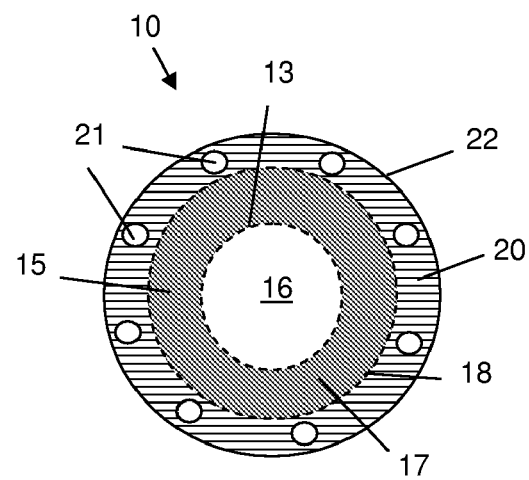
FIG. 1C is an end view of a concentric three-tube reactor assembly as employed in the apparatus shown in FIG. 1.

At end 12 is an attached sulfur separator 2 having a feed gas inlet 4, a liquid sulfur outlet 6 and a gas channel 8. The interior channel 16 of tube assembly 10 is open to the gas channel 8 of separator 2 at end 12 for receiving $H_2S$ and $SO_2$ containing feed gases. The first annulus 17, containing catalyst 5 and support material 15, is closed at end 12, and outer annulus 20 is partially closed to the gas channel 8 by tube sheet 9 which has spaced apart weep holes 21 for allowing liquid sulfur to drain into separator 2. The weep hole size is designed to hold a head of liquid sulfur greater than the pressure drop between the feed side and the liquid sulfur collection area, in order to prevent pressurized $H_2S$ and $SO_2$ feed gases from entering annulus 20 via weep holes 21. The shell space 23 is closed at end 12 (by tube sheet 9) where assembly 10 joins to sulfur separator 2. FIG. 1C, is an end view of the upstream end 12 of concentric tube assembly 10 showing the inside channel 16, first, second, and third tubes 13, 18, 22, closed-ended annulus 17, and annulus 20 with weep holes 21.

Referring again to FIG. 1A, opposite end 12 (at downstream end 14), the outer annulus 20 opens into process channel 30, which comprises process gas outlet 32. At end 14, the first annulus or channel 16 is closed, preferably terminating at removable cap 19. Beginning at the downstream end 12 of assembly 10, annulus 17 is filled with sequential layers of support material 15, catalyst 5, and more support material 15. Condensed sulfur droplets 27 along wall 22 and coalesced, condensed sulfur 28, as occur during operation of the Claus reactor unit 1 are also conceptually shown in FIG. 1A.

Figure 2:
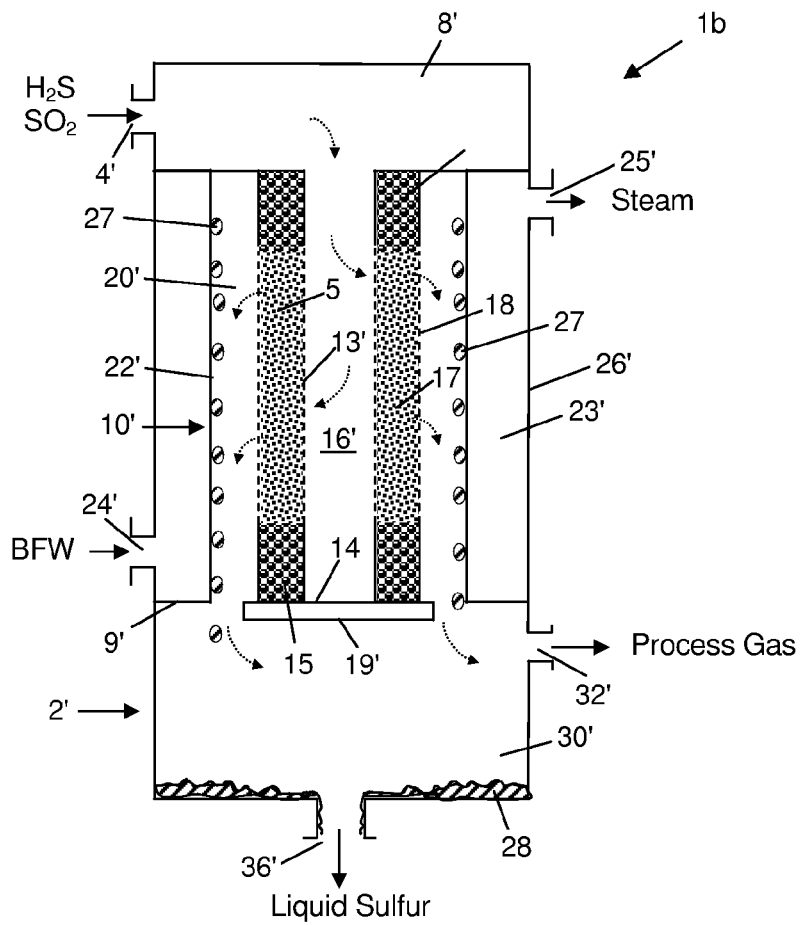
FIG. 2 is a longitudinal cross-section view of a vertically oriented compact tubular Claus catalytic reactor-heat exchanger combined unit (tubular Claus catalytic reaction unit) configured for initial downward flow of feed gas, in accordance with another embodiment of the present invention.

B. Vertical Orientation—Downward Flow. Referring now to FIG. 2, an alternative single-stage TClaus reactor is shown which is designed for downward gas flow. This downward gas flow design is similar to the TClaus reactor shown in FIG. 1A except, most notably, the concentric tubular assembly is inverted, the weep holes are omitted, and the feed gas inlet and the process gas outlets are exchanged. This downward gas flow design is preferred in many instances because it avoids the need for weep holes and the necessity of holding a liquid level in the outer annulus during use of the TClaus reactor. In use, the downward gas flow design allows the sulfur and gas product to leave the tube assembly without risk of having the gas jump from the inlet directly to the process gas outlet.

More specifically, in the TClaus reactor 1b, shown in FIG. 2, designed for downward gas flow, channel 16 is open at upstream end 12' and closed at downstream end 14' by cap 19. Catalyst 5, support material 15, channel 16, first annulus 17, first, second, and third tubes 13, 18 and 22, tube sheet 26 and shell space 23 are as described above with respect to FIG. 1A. At end 12' is an attached sulfur separator 2' having a liquid sulfur outlet 36', process gas channel 30' and process gas outlet 32'.

At upstream end 12' is gas channel 8' having a feed gas inlet 4'. The interior channel 16' is open to the gas channel 8' for receiving the $H_2S$- and $SO_2$-containing feed gas. At downstream end 14', the outer annulus 20' opens into product channel 30' of sulfur separator 2', which comprises process gas outlet 32'. Condensed sulfur droplets 27 along wall 22' and coalesced, condensed sulfur 28 in separator 2', as occur during operation of the TClaus reactor unit 1b are also conceptually shown in FIG. 2. At end 14', channel 16 is closed, substantially as described above with respect to FIG. 1A. Notably, counterparts to tube sheet 9 and weep holes 21, depicted in FIG. 1C, are absent in this downward gas flow TClaus reactor unit. At end 14', the outer annulus 20' opens into product channel 30, which comprises process gas outlet 32'.

Figure 3:
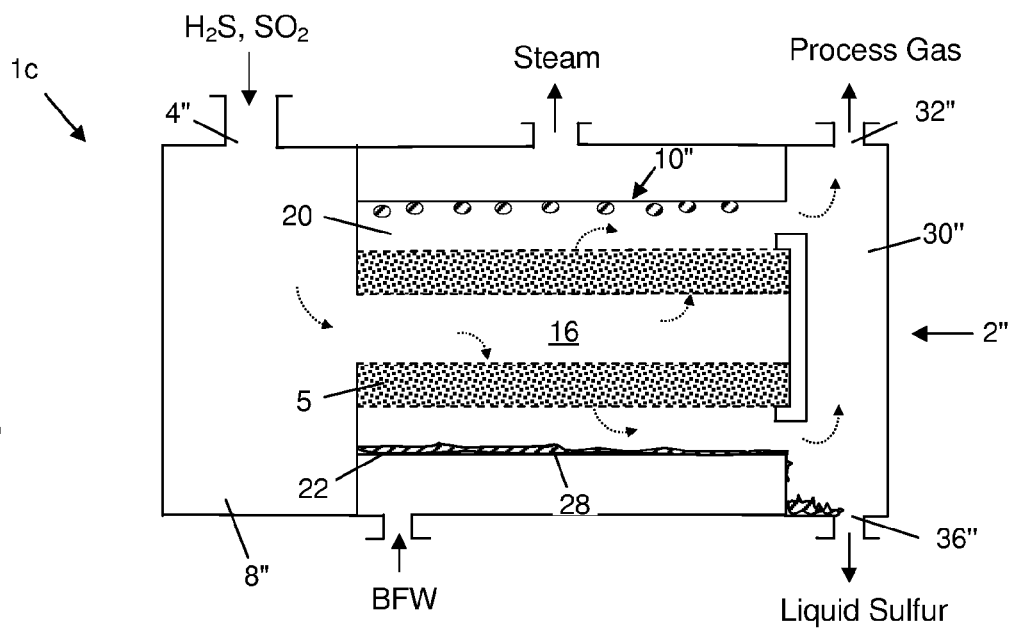
FIG. 3 is a longitudinal cross-section view of a compact single-stage tubular Claus catalytic reactor according to an embodiment of the present invention.

C. Horizontal Orientation. Another representative compact single-stage tubular Claus catalytic reactor, shown in FIG. 3, is similar to that described above and illustrated in FIG. 2, except that it is oriented horizontally instead of vertically. Similar to the downward gas flow design of the vertically oriented reactor, weep holes in tube sheet 9 between annulus 20 and sulfur separator 2'' are unnecessary, and are therefore omitted, since the process gas and liquid sulfur product are emitted into the same volume (i.e., channel 30'' of sulfur separator 2''). By contrast, the upward flow vertical configuration (FIG. 1A) provides for the process gas and liquid sulfur to emanate from opposite ends of the tubular assembly 10. Another potential advantage of the horizontally oriented TClaus reactor unit is that it is unnecessary to take up space at the ends of the catalyst with support material since catalyst settling is a lesser issue when the horizontal unit is employed.

II. Multi-Stage Tubular Claus Catalytic Reactor for a Sulfur Recovery Plant.

Figure 4:
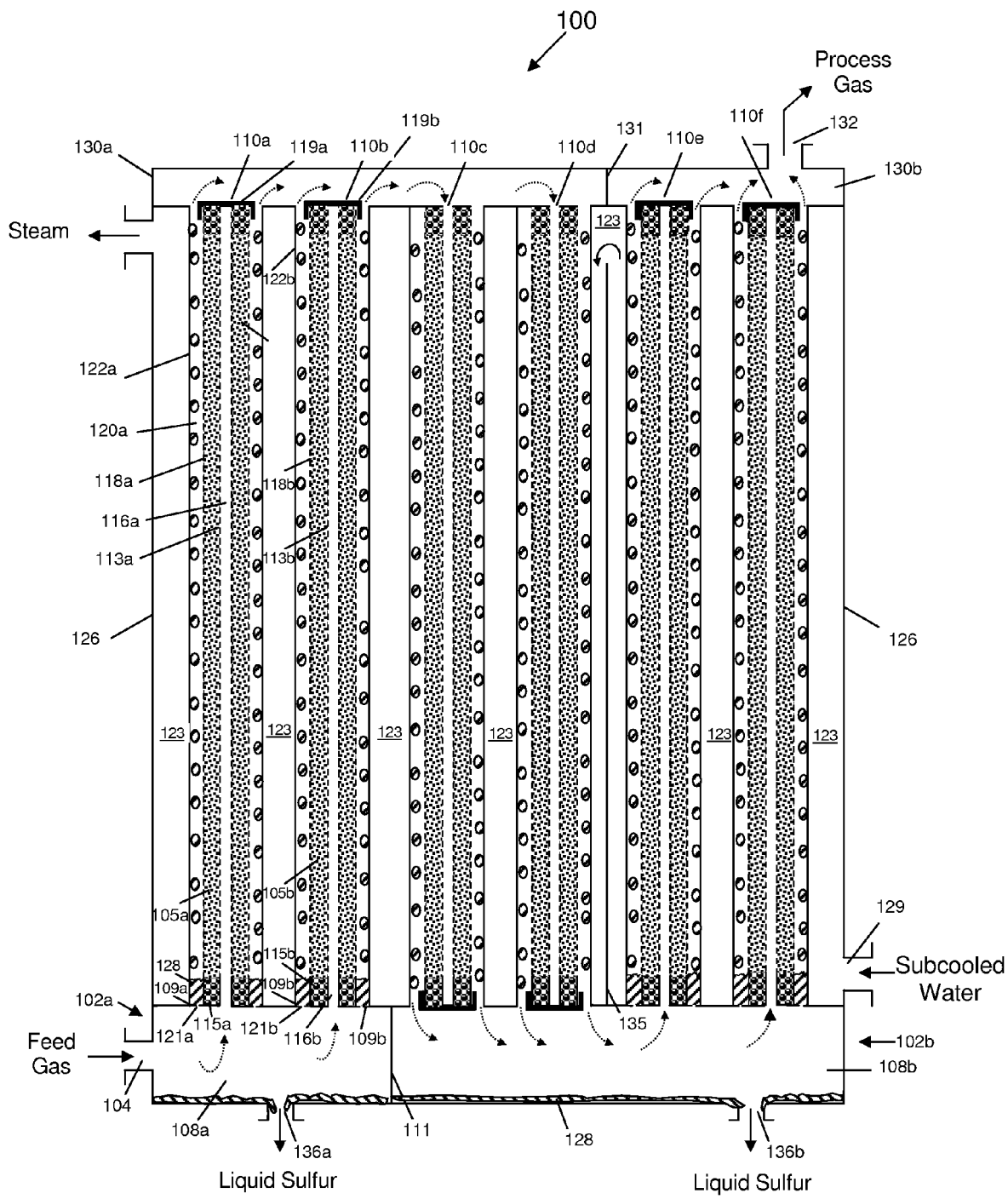
FIG. 4 is a longitudinal cross-section view of a vertically oriented compact multi-stage Claus catalytic reactor unit according to an embodiment of the present invention.

Referring now to FIG. 4, by applying the geometry of the above-described compact Claus reaction unit, and taking advantage of the low catalyst volumes required to reach equilibrium for each stage, several Claus catalytic stages can be combined into a single vessel. This eliminates the need for separate reheaters, catalyst beds, and condensers, thus saving plot space, equipment cost, instrument costs, catalyst costs, and maintenance costs. A representative multi-stage or multi-pass Claus reactor-heat exchanger vessel or unit 100 is schematically depicted in FIG. 4. An array of six sets of reactor assemblies 110a-f, corresponding to three Claus stages, are arranged inside a heat exchanger shell 126 so that, in use, the cooling fluid inside shell 126 can contact the respective solid outer tubes of the assemblies (e.g., tubes 122a-b). Each concentric reactor assembly is similar to assembly 10 as depicted in FIG. 1A. For example, assembly 110a comprises three vertically oriented concentric tubes 113a, 118a and 122a, and includes a catalyst bed 105a disposed between the inner and middle tubes. As in FIG. 1A, annular catalyst bed 105a is bounded at each end by a layer of support material 115a. The shell 126 preferably contains an internal baffle 135 to provide for water overflow, as further described in Section XII, below, regarding use of the multi-stage TClaus reactor unit.

The first pair of reactor assemblies 110a and 110b are oriented for receiving upwardly flowing inlet gases containing $H_2S$ and $SO_2$ from attached channel 108a, and for discharging the reacted gases into channel 130a, which is attached at the opposite ends of assemblies 110a-b. A second pair of reactor assemblies 110c and 110d is inverted relative to the first pair and is positioned for receiving the reacted gases from the first pair of reactor assemblies via channel 130a and for discharging the downwardly flowing reacted gases into channel 108b. The second pair of assemblies omits the weep holes that are present in the first and third pairs of reactor assemblies. A divider or partition 111 is located between channels 108a and 108b, to direct gas flow through the tubes in stages. A third pair of reactor assemblies 110e and 110f are inverted relative to the second pair of reactor assemblies, and are oriented for receiving the reacted gases from the second pair of assemblies via channel 108b, and for discharging the upwardly flowing reacted gases into channel 130b. Channel 130b contains process gas outlet 132. The first and third pairs of assemblies (110a, 110b, 110e and 110f) comprise tube sheets (e.g., 109a, 109b) with weep holes (similar to those shown in FIGS. 1A and 1C) to allow condensed sulfur to seep into sulfur separator 102a or 102b, as dictated by partition 111. Channels 108a and 108b contain liquid sulfur outlets 106a and 106b, respectively. Another divider or partition 131 is disposed between channels 130a and 130b) to direct the process gases through the tubes in stages, and finally toward outlet 132.

Figure 5:
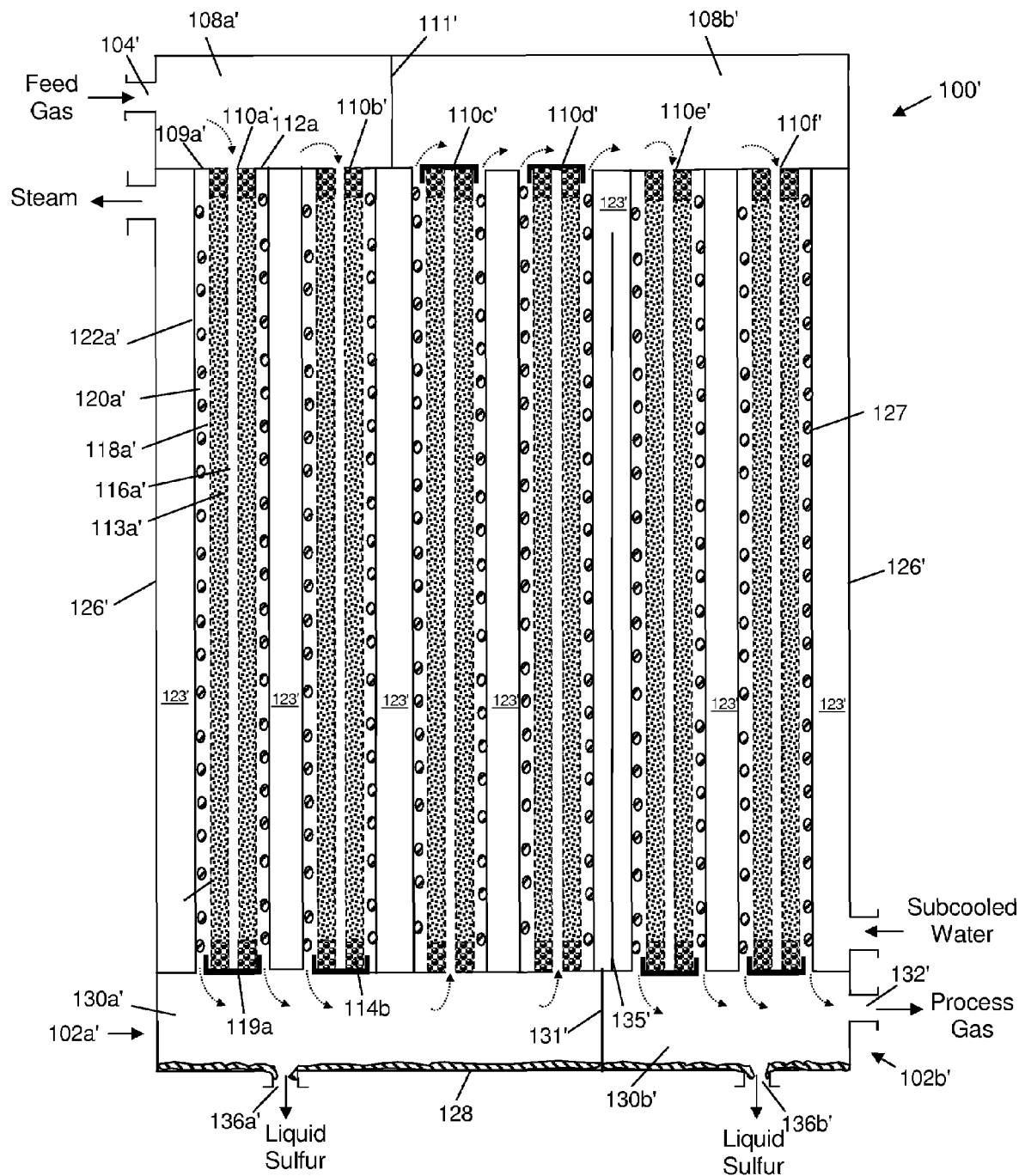
FIG. 5 is a longitudinal cross-section view of a vertically oriented compact multi-stage tubular Claus catalytic reaction unit configured for initial downward flow of feed gas, in accordance with another embodiment of the present invention.

Referring now to FIG. 5, the vertically oriented multi-stage reactor design shown in FIG. 4 can be modified to provide for initial downward gas flow, if desired, instead of commencing with upward gas flow. In this case, the tubular assemblies 110a'-f' are inverted relative to the way they are shown in FIG. 4, the weep holes are omitted from each annular tube sheet (e.g., 109a'), and the locations of the feed gas inlet 104' and the process gas outlet 132' are exchanged. More specifically, channel 108a, which include feed gas inlet 104', and channel 108b' together comprise the top of unit 100'. The interior channels 116a'-118b' of the first pair of tube assemblies 110a'-b' are open at the upstream ends (e.g., 112a) and closed at the downstream ends (e.g., 114b') by respective caps (e.g., 119a'). Sulfur separators 102a'-b', including process gas channels 130a' and 130b', divider 131', sulfur outlets 136a' and 136b', and outlet 132 comprises the bottom of unit 100'.

In most situations of use, one of the above-described vertically oriented multi-stage vessels is preferred. However, the multi-stage units can also be oriented horizontally, if desired, like the horizontally oriented single-stage unit shown in FIG. 3. In this case, the structure is similar to the above-described downward gas flow multi-stage unit of FIG. 5. The partitions like 111, 131 (in sulfur separators 108a'-b' and 130a'-b') are positioned to segregate the liquid sulfur product stream from each stage, and are positioned so as to not allow feed gas or process gas to skip a reaction stage. The horizontal multi-stage TClaus reactor design provides for liquid sulfur to emerge out of the open end of each outer annulus (like 120a') without the use of weep holes. In the horizontal configuration, the segregated cooling media arrangement is not possible, so a baffle like 135 (FIG. 4) is omitted.

It should also be appreciated from the foregoing examples that fewer or more than six tubular reactor assemblies can be employed in a multi-stage reactor, and that the groups making up each stage or pass may be other than pairs of concentric tube assemblies, depending upon the particular requirements of the TClaus reaction unit for a given application.

III. Catalyst

The new tubular Claus catalytic reactor units contain a catalyst that is active for catalyzing the Claus reaction (Equation 3). The Claus catalyst is packed into one or more tubes of the reactor (FIG. 1A, 2, 4 or 5), and comprises individual particles of high surface area metal oxides such as gamma alumina, titania, or gamma alumina particles deposited on ceramic foam monoliths, or comprises structured ceramic materials coated with particles of gamma alumina or other catalytically active material. Monoliths and structured packing with high surface area particles are preferred because the pressure drop through these catalyst forms are generally lower than for beds of individual particles. "Structured packing" refers to a three-dimensional, rigid filler having a large surface area and low total weight/volume, usually made with regular structural features. When the Claus catalyst is in the form of individual particles or divided structures of high surface area, round beads or spheres are preferred, although other natural or engineered shapes or forms (e.g., cylinders, tri-lobes, quadra-lobes, etc) could be used instead. The only restriction as to size or geometry of the catalyst is that the catalyst particles or divided structures fit the designated annulus in the waste heat exchanger or condenser. Alumina spheres ¼ inch to about ½ inch (0.635-1.270 cm) in diameter have been employed successfully, and are considered representative of other suitable catalyst compositions and geometries. The geometry of the Claus catalyst is preferably such that the packed tube(s) of the reactor offers little resistance to flow, or causes only a slight increase in pressure drop versus an empty tube during operation of the system. The surface area of the catalyst or catalyst support is preferably higher than 300 m$^2$/g. A typical aged Claus catalyst may have a surface area of 140 m$^2$/g or more. "Aged" catalyst refers to a catalyst that has been in service and has lost a portion of its original activity due to loss of surface area or due to chemical degradation of the surface, or due to buildup of soot or other deposits. The Claus catalyst must be capable of withstanding operating temperatures up to about 400° C. and GHSVs up to 30,000 h$^{-1}$ without suffering significant mechanical or thermal degradation and without causing a pressure drop exceeding 2 psi across the bed.

IV. Claus Plant with Tubular Claus Catalytic Reactor in Series Flow Arrangement.

Figure 6:
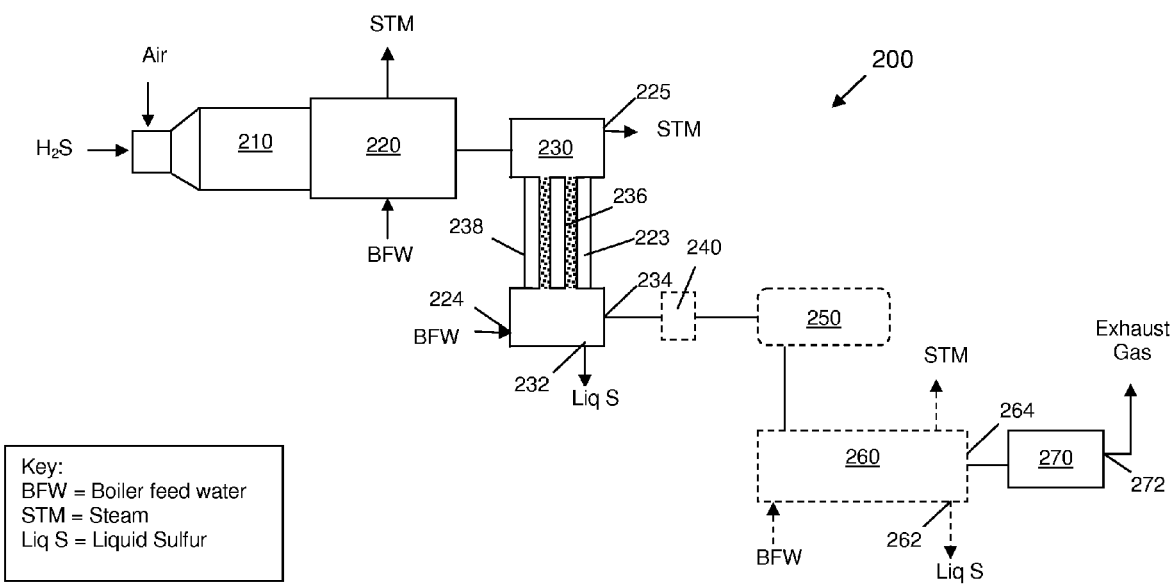
FIG. 6 is a schematic drawing of a Claus sulfur recovery plant employing a single-stage or multi-stage tubular Claus catalytic reaction unit of in series (global) flow arrangement, in accordance with an embodiment of the present invention.

As shown in FIG. 6, one exemplary Claus sulfur recovery plant 200 is configured for series flow starting with a conventional reaction furnace 210 followed by a high temperature waste heat boiler (WHB) 220. A tubular Claus catalytic reactor 230, as described above in Section I or II, follows WHB 220, and includes a liquid sulfur outlet 232, process gas outlet 234, and a plurality of tubes 236 enclosed in a tube sheet or shell 238. Reactor 230 also includes a feed water inlet 224 and water/steam outlet 225 in fluid communication with interior space 223 of shell 238. Tubes 236 contain Claus catalyst, as described in Section III, above. Following process gas outlet 234 of reactor 230 is a heater 240 for pre-heating process gas which, when the plant is in operation, emerges from outlet 234 prior to entering Claus catalytic reactor 250. Claus catalytic reactor 250 can be a conventional type such as those that are in wide-spread use today, followed by a conventional sulfur condenser 260 with liquid sulfur outlet 262 and process gas outlet 264. A tail gas treatment unit or an incinerator 270 follows condenser 260 and includes an exhaust gas outlet 272. In a variation of this plant configuration, the preheater 240, Claus catalytic reactor 250 and condenser 260 are eliminated, particularly in situations in which the residual sulfur content of the process gas exiting the tubular reactor 230 is sufficiently low to be treated directly in the tail gas treatment unit 270. For instance, this alternative configuration may be particularly desirable when a multi-stage Claus tubular reactor is employed. In another variation of the sulfur plant configuration shown in FIG. 6, the heater 240, Claus catalytic reactor 250 and condenser 260 are replaced by a second TClaus reactor unit like reactor unit 230.

V. Claus Plant with Tubular Claus Catalytic Reactor in Parallel Flow Arrangement.

Figure 7:
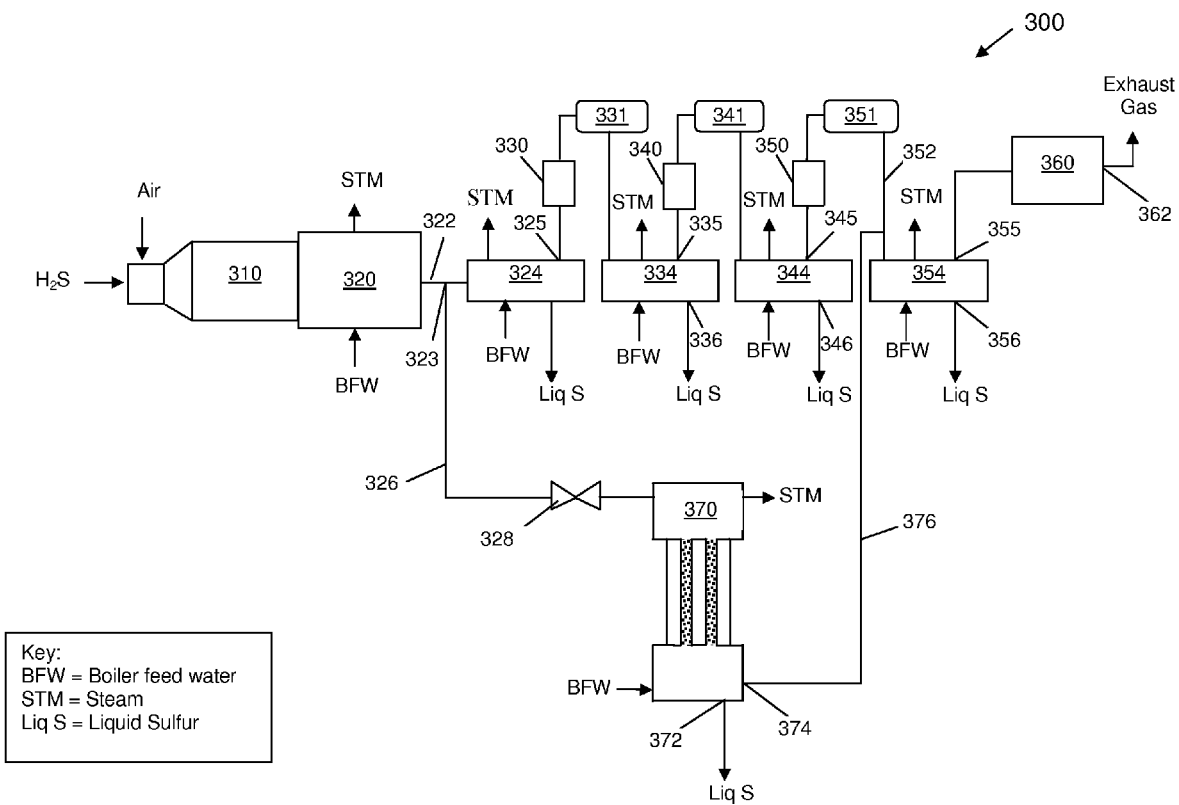
FIG. 7 is a schematic drawing of a Claus sulfur recovery plant retrofitted with a tubular Claus catalytic reaction unit in parallel with a conventional Claus plant assembly, in accordance with an embodiment of the present invention.

As shown in FIG. 7, an existing Claus sulfur recovery plant 300 configured for series flow is modified by addition of a new tubular Claus catalytic reactor in parallel with a group of conventional Claus catalytic reactor units. The retrofitted plant comprises a conventional boiler/reaction furnace 310 followed by a high temperature waste heat boiler (WHB) 320. Following process gas outlet 322 of WHB 320 is sulfur condenser 324 and heater 330 for pre-heating process gas that emerges during operation of the plant from outlet 325 prior to entering a first Claus catalytic reactor 331. First Claus catalytic reactor 331 is followed by the second conventional sulfur condenser 334, which has a liquid sulfur outlet 336 and process gas outlet 335. Heater 340 follows second condenser 334 and precedes second Claus catalytic reactor 341. After reactor 341 is third sulfur condenser 344, having liquid sulfur outlet 346 and process gas outlet 345, which is followed by heater 350. Heater 350 precedes a third Claus catalytic reactor 351. Following reactor 351 is fourth sulfur condenser 354, having liquid sulfur outlet 356 and process gas outlet 355. Line 352 connects reactor 351 to condenser 354, for carrying process gas from reactor 351 to condenser 354. A tail gas treatment unit or an incinerator 362 follows condenser 354 and includes an exhaust gas outlet 362. Between WHB 320 and first condenser 324 is line 323 from which line 326 branches and extends to a tubular Claus catalytic reactor 370, as described above in Section I or II. A flow control valve 328 is included in line 326, to control the flow of process gas going to tubular Claus catalytic reactor 370. Following valve 328 is reactor 370, which includes a liquid sulfur outlet 372 and process gas outlet 374. From outlet 374, line 376 extends and joins to line 352.

Compact, High Efficiency Heat Exchangers.

Additional improvement of a sulfur recovery plant is accomplished by providing for the removal of heat from the process gases after each reaction step. The design of the waste heat exchanger or boiler following the burner/furnace (thermal) zone and the subsequent sulfur condensers of a conventional sulfur recovery plant are major factors in the overall performance of the plant. A generally accepted design principle for waste heat boilers is to control the heat flux through the tube wall below 30,000 BTU/hr/ft$^2$. This recommended level prevents overheating of the tube by keeping the outside of the tube wall wetted with water.

VI. Waste Heat Exchanger with HTEM-Filled Tubes.

As disclosed in co-pending U.S. patent application Ser. No. 11/367,077, filed Mar. 3, 2006, the disclosure of which is hereby incorporated herein by reference, the introduction of heat transfer enhance material ("HTEM") in a cooling zone greatly accelerates the rate of heat transfer from a gas stream. This enhanced heat transfer effect was demonstrated in an experiment carried out in a laboratory scale assembly 400 illustrated in FIG. 8. A short contact time partial oxidation reaction zone 402 0.75 inch (1.90 cm) long for catalytic partial oxidation of H$_2$S was placed in a 0.5 inch (1.27 cm) diameter×20 inch (50.8 cm) long quartz tube 401. A "clam shell/flange" heater 409a, in operable contact with heater control assembly 409, was positioned about the tube preceding zone 402. The partial oxidation catalyst 405 was preceded by a porous ceramic shield 403a and followed by a porous ceramic floor 403b. Following partial oxidation reaction zone 402 was cooling zone 406 which comprised a portion of the quartz tube 401 surrounded by a jacket 408 having inlets and outlets for a circulating heat transfer fluid in concert with a pump and temperature control 416. A thermocouple 407 was located at the exit 404 of the partial oxidation reaction zone 402. The inner tube (portion 410) within cooling zone 406 was also equipped with a multi-point thermocouple 412 to read temperatures along the axis of the cooling zone, at points 413a-c which were spaced apart at approximately 2-3 inch (7.6 cm) intervals. This constituted the control apparatus.

In operation, air and H$_2$S were mixed and preheated upstream of the partial oxidation zone using the "clam shell/flange" heater 409a and heater control assembly 409b. After the partial oxidation reaction, gaseous products from the catalytic oxidation of H$_2$S enter cooling zone 406. Inside the jacket, a circulating silicone oil heat transfer fluid (Dowtherm®) removed heat from the gases leaving the partial oxidation reaction zone 402 in concert with the operation of the oil pump and temperature control device 416. During the control test, flow rates were varied and the air to H$_2$S ratio was varied. Gas flows, the pressure upstream of the reaction zone, and temperatures were monitored during the test. Table 4 shows the data collected from the experiment.

Figure 8:
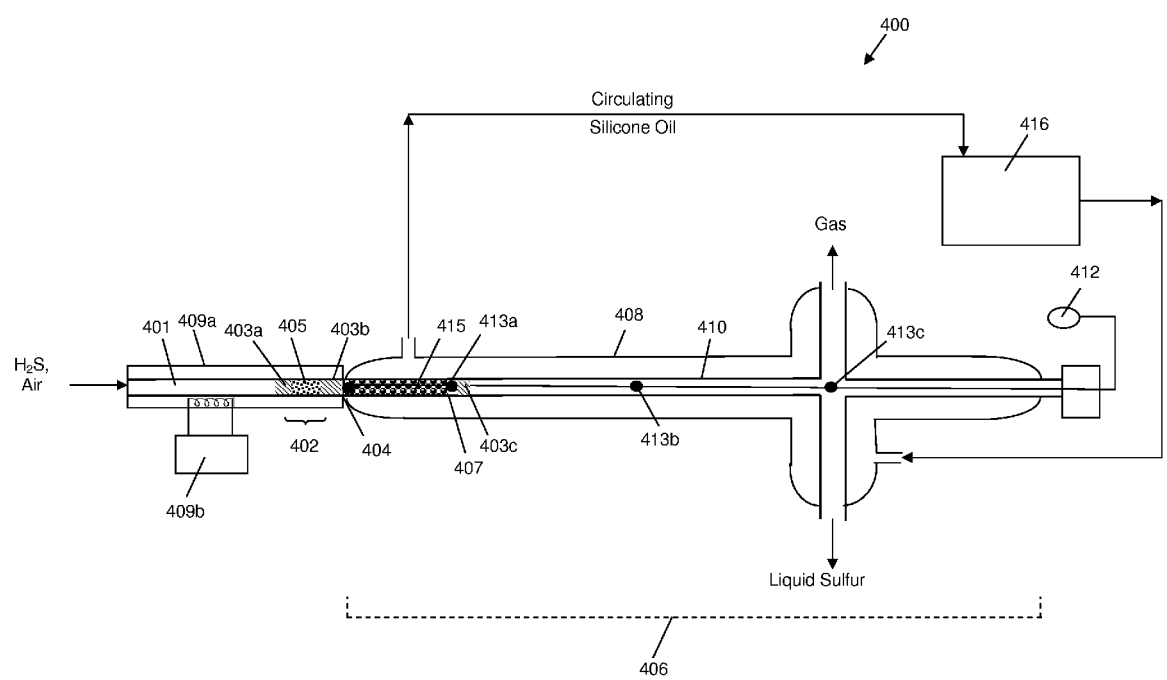
FIG. 8 is a schematic drawing of a laboratory scale assembly for demonstrating the effect of using a heat transfer enhancement medium in the cooling zone following the catalytic partial oxidation of $H_2S$, in accordance with an embodiment of the present invention.

In a similar experiment, the effect of addition of heat transfer enhancement material was tested. The above-described control apparatus was modified as follows: the zone between the floor 403b of the partial oxidation reaction zone and the tip of the multi-point thermocouple 407 was filled with a heat transfer enhancement medium (HTEM) 415 consisting of smooth quartz beads approximately ⅟₁₆ inch (0.159 cm) in diameter and ⅛ inch (0.318 cm) long, followed by a porous ceramic floor 403c, as shown in FIG. 8. The data collection was repeated under the same flow and air/H$_2$S ratio conditions as the first test with the bare tube (control). The "inert" quartz beads are physically and chemically resistant or inert to corrosive carbon or sulfur-containing compounds. The data from this experiment is shown in Table 5. Comparing the data in Tables 4 and 5, it is seen that the introduction of the inert beads in the cooling zone greatly accelerates the rate of heat transfer from the gas stream. Heat and material balances were made on the cooling zone using the data collected in Tables 4 and 5. From these balances, and from the tube 401 geometry, overall heat transfer coefficients for this section of the tube were computed for both experiments.

These data show that the improvement in heat transfer due to inserting the quartz beads was great enough to allow the mixture to drop below the sulfur dew point, approximately 530° F. (276.7° C.) at the thermocouple 2 inches from the reactor floor. Using the quartz beads in the tube, the overall heat transfer coefficient (U, Btu/hr/sq ft/° F.) for just sensible heat removal improves about 2.5-3 times that of the bare tube. After reaching the dew point, the heat of condensation is removed from the mixture along with sensible heat. This additional heat removal increases the overall heat transfer coefficient by a factor of about 5 times that of the bare tube. Surprisingly, the pressure drop through the entire system did not increase significantly with the addition of the beads in the cooling zone. Another unexpected result was that there was significant sulfur condensation taking place on the surface of the beads and not simply on the walls of the tube. Still another positive observation was that the beads did not facilitate the deposition of solid sulfur that could have plugged the flow through the tube. In addition, it was observed that the beads greatly assisted in coalescing the condensed liquid sulfur. This feature is especially useful for deterring or preventing the problems of fogging/sulfur misting and sulfur entrainment, which are common with many Claus plant sulfur condensers and waste heat boilers in use today. Without wishing to be bound by a particular theory to explain these results, it is proposed that the quartz beads improved the turbulence in the heat exchange zone which improved the inside heat transfer coefficient. In this system the heat transfer coefficient is by far the greatest resistance to heat transfer.

Figure 9:
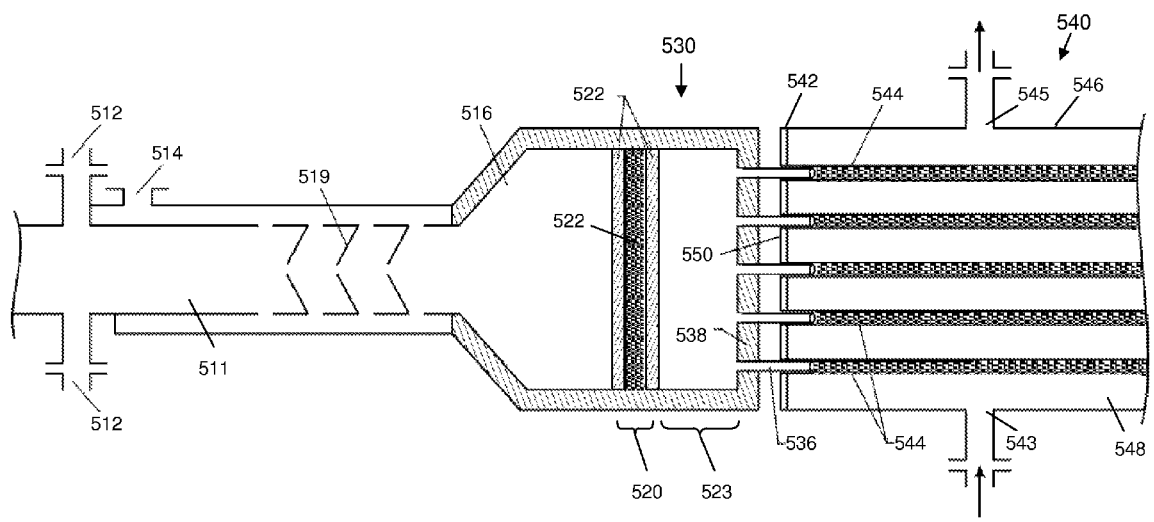
FIG. 9 is a longitudinal cross section view of a short contact time reactor and a portion of an attached heat exchanger for a Claus sulfur recovery plant, in accordance with an embodiment of the present invention.

Referring now to FIG. 9, a HTEM-enhanced waste heat boiler (WHB) 540 for use in a pilot or commercial scale application is schematically shown in combination with a short contact time reactor 530, which is described in more detail in Section XI, below. WHB 540 comprises a shell 546 and tube sheet 542 comprising a plurality of thermally conductive tubes 544 for partially cooling hot process gas containing elemental sulfur vapor. The tubes 544 and tube sheet 542 are preferably made of carbon steel. Tubes 544 are packed with heat transfer enhancement medium (HTEM), which is described in more detail in the following section. Shell 546 of the heat exchanger surrounds the outside of tubes 544, and is suitable for circulating a suitable heat exchange fluid (e.g., boiling water) at high pressure in the shell space 548. For convenience, the cooling fluid is sometimes referred to herein simply as "water" and the cooling fluid vapor is simply called "steam." Shell 546 includes water inlet 543 and steam outlet 545. The carbon steel of the tubes and tube sheet cannot withstand the high temperatures of process gas from short contact time reactor 530 (i.e., about 1,300° C.), temperature protection is needed for the exposed metal in both the tubes and the tube sheet. For tubes 544 and for most of the tube sheet 542, this protection will be provided by the circulation of boiling water during use of the heat exchanger. Since boiling water remains at a constant temperature, and since the metal tubes readily conduct heat, in practice the tubes 544 and most of the tube sheet 542 attain temperatures only slightly above the temperature of the boiling water (i.e., about 150 to 250° C. depending on the steam pressure being generated). Where tubes 544 connect at joints 550 of tube sheet 542, additional thermal protection is provided to ensure that the joints and the first part of each tube 544 are protected from temperatures exceeding the safe operating limits for the metal. Refractory covering 538 and ceramic ferrules (tube inserts) 536 provide insulation for these less unprotected areas of metal. An advantage of adding the HTEM such as inert quartz beads to the tube in a Claus plant waste heat boiler is the significant reduction in size of the heat exchangers in the unit. For example, the length of heat exchanger could be reduced by about 20-60%. Moreover, it offers the advantage of being able to operate the waste heat boiler in either a horizontal or vertical orientation, similar to that described in U.S. patent application Ser. No. 11/367,077, in which reduced size heat exchangers are combined with short contact time $H_2S$ partial oxidation technology to create more compact and less costly unit designs. While adding the HTEM to the tube may increase the pressure drop per unit length of the tube, the reduction in tube length of a heat exchanger using this technique tends to offset the effects of any associated increase in pressure drop. The net result is a much less expensive and more compact, more efficient, heat exchanger.

VII. Heat Transfer Enhancement Medium (HTEM).

The heat transfer enhancement medium (HTEM) is preferably physically and chemically resistant or inert to corrosive carbon or sulfur-containing compounds and other chemical components of the effluent from the Claus burner/reaction furnace, and does not take part in detrimental or undesirable chemical reactions involving sulfur species when the system is in operation. For simplicity, representative forms of HTEM are sometimes referred to herein as "inert beads," or the like. The heat transfer enhancement medium is preferably also resistant to degradation at the high temperatures that it will experience during operation of the system. Preferred HTEMs are carbon-containing materials (e.g., silicon carbide, boron carbide, tungsten carbide) and quartz in the form of smooth, round beads, although other suitable ceramic materials and other natural or engineered shapes or forms (e.g., rings, spheres, balls, cylinders) could be used instead, provided that the medium is capable of improving the rapid transfer of heat from the rapidly flowing process gases during operation of the sulfur recovery system. Preferably the geometry of the HTEM is such that the packed vessel offers little resistance to flow, or causes only a slight increase in pressure drop (e.g., 2 atm) during operation of the system, relative to operation of the process using an empty heat exchange tube. It is also preferred that the ratio of the vessel diameter to the equivalent particle diameter of the HTEM be greater than 6. HTEM particulates The HTEM is preferably hydraulically smooth, as defined by the roughness parameter being less than 0.1 (Reference: UNIT OPERATIONS OF CHEMICAL ENGINEERING, Fourth Edition, 1988, McGraw Hill, page 86-88). The same HTEM may be used in any of the heat exchange vessels described herein to facilitate heat transfer. In many cases, the heat exchangers of existing sulfur recovery units can be retrofitted to improve thermal performance by filling the existing cooling tubes with HTEM.

VIII. Sulfur Condenser with HTEM-Containing Tubes.

Figure 12:
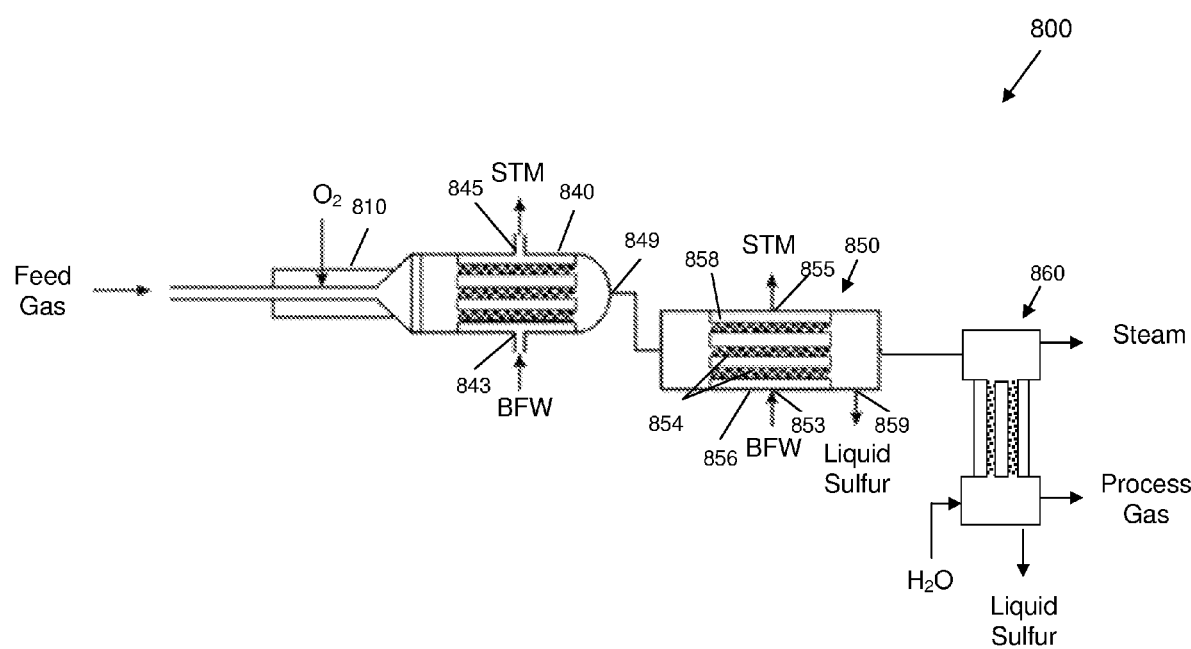
FIG. 12 is a schematic drawing of a Claus sulfur recovery plant employing a short contact time reactor in combination with a HTEM-containing heat exchanger, a HTEM-containing sulfur condenser and a tubular Claus catalytic reactor, in series flow arrangement, in accordance with an embodiment of the invention.

Referring briefly to FIG. 12, a HTEM-modified sulfur condenser 850 is shown in combination with a short contact time reactor 810, waste heat boiler 840 and tubular Claus catalytic reactor unit 860. Similar to the above-described high temperature waste heat exchanger, sulfur condenser 850 is also advantageously modified by packing the cooling tubes 854 with HTEM. The shell or tube sheet 856 surrounds the HTEM-filled tubes 854, and is suitable for circulating low pressure (e.g., 2 atm) boiling feed water in the interior shell space 858 via BFW inlet 853 and steam outlet 855. Condenser 850 also includes a liquid sulfur outlet 857 and process gas outlet 839. An advantage of adding HTEM, such as inert beads, to the tubes 854 of a sulfur condenser for a sulfur recovery plant 800 is the significant reduction in size of the sulfur condenser (i.e., about 20-60%), and, as a result, a corresponding reduction in the size of the entire plant. A sulfur condenser with HTEM-filled tubes can be operated in either horizontal or vertical orientation. Although the presence of HTEM in the tubes of a sulfur condenser may increase the pressure drop per unit length of the tube, the reduction in tube length afforded by packing the tube with HTEM offsets at least some of the effects of any increased pressure drop. The net result is a much less expensive, more compact, and more efficient sulfur condenser, compared to a conventional sulfur condenser.

Figure 10:
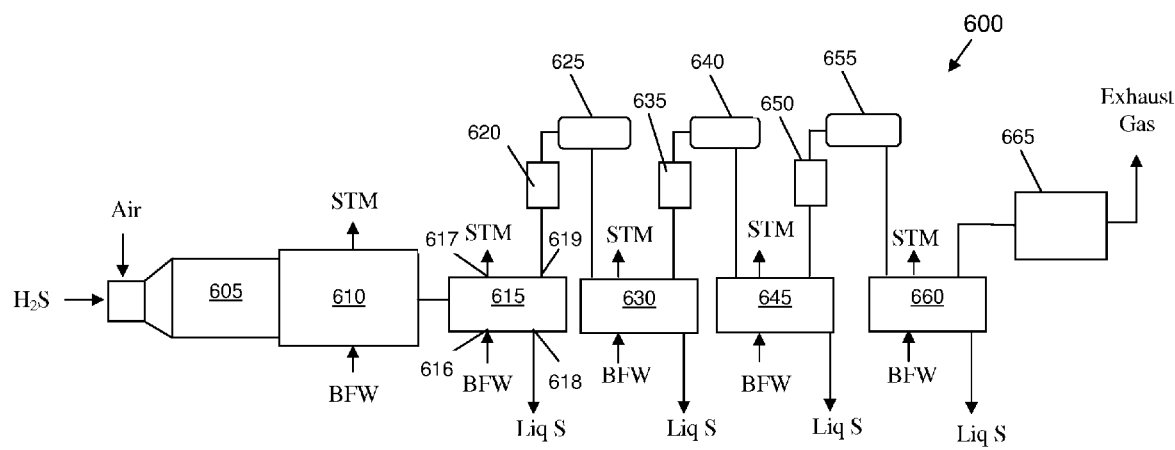
FIG. 10 is a schematic drawing of a Claus sulfur recovery plant employing at least one sulfur condenser containing heat transfer enhancement medium (HTEM), in accordance with an embodiment of the present invention.

A similar HTEM-containing sulfur condenser 615 is also shown schematically in FIG. 10, in combination with a conventional Claus burner/furnace 605, waste heat boiler 610 and heater 620, which precedes a Claus catalytic reactor 625. The condenser provides for the circulation of low pressure (e.g., 2 atm) boiling water via boiling feed water inlet 616 and steam outlet 617. Condenser 615 also includes a liquid sulfur outlet 618 and process gas outlet 619.

IX. Claus Sulfur Recovery Plant with HTEM-filled Sulfur Condenser

Referring still to FIG. 10, an improved Claus sulfur recovery plant 600 is schematically shown in which a conventional Claus burner/furnace 605 and waste heat boiler 610 combination are followed by a sulfur condenser 615 in which the tubes are filled with HTEM, which is described in Section VII, above. In succession after condenser 615 are three Claus catalytic reactor units, each comprising a heater 620, 635, 650, catalytic reactor 625, 640, 655, and sulfur condenser 630, 645, 660, respectively. Following the final Claus unit is a tail gas treatment unit 665. The size of condenser 615 is smaller and more efficient than most conventional sulfur condensers in existing Claus sulfur recovery plants, due to the use of shorter cooling tubes and inclusion of a suitable heat transfer enhance material (HTEM) in the HTEM-containing condenser. By using at least one high surface area/low pressure drop sulfur condenser 615, a significant reduction in the overall size of the sulfur recovery plant is achieved. Further reduction in the total footprint of the plant is obtained in a new sulfur recovery plant when waste heat boiler 610 and sulfur condensers 630, 645 and 660 also contain HTEM. HTEM can be used in any or all of the heat exchangers to improve their performance and to reduce their size and cost. Existing sulfur recovery plants can also be retrofitted in a similar manner to increase capacity and at the same time reduce the plot size of the plant. Since the heat transferred is the product of heat transfer coefficient, area and log-mean temperature difference, if the heat transferred remains the same, and the log-mean temperature difference remains the same, then if the heat transfer coefficient improves by a factor of 2 to 5, the required area for heat transfer goes down by the same factor. Thus, if the tube geometry is the same (inside and outside surface area per length of tube), the length of the tube will decrease by the same factor.

X. Claus Sulfur Recovery Plant with HTEM-filled Waste Heat Boiler

Figure 11:
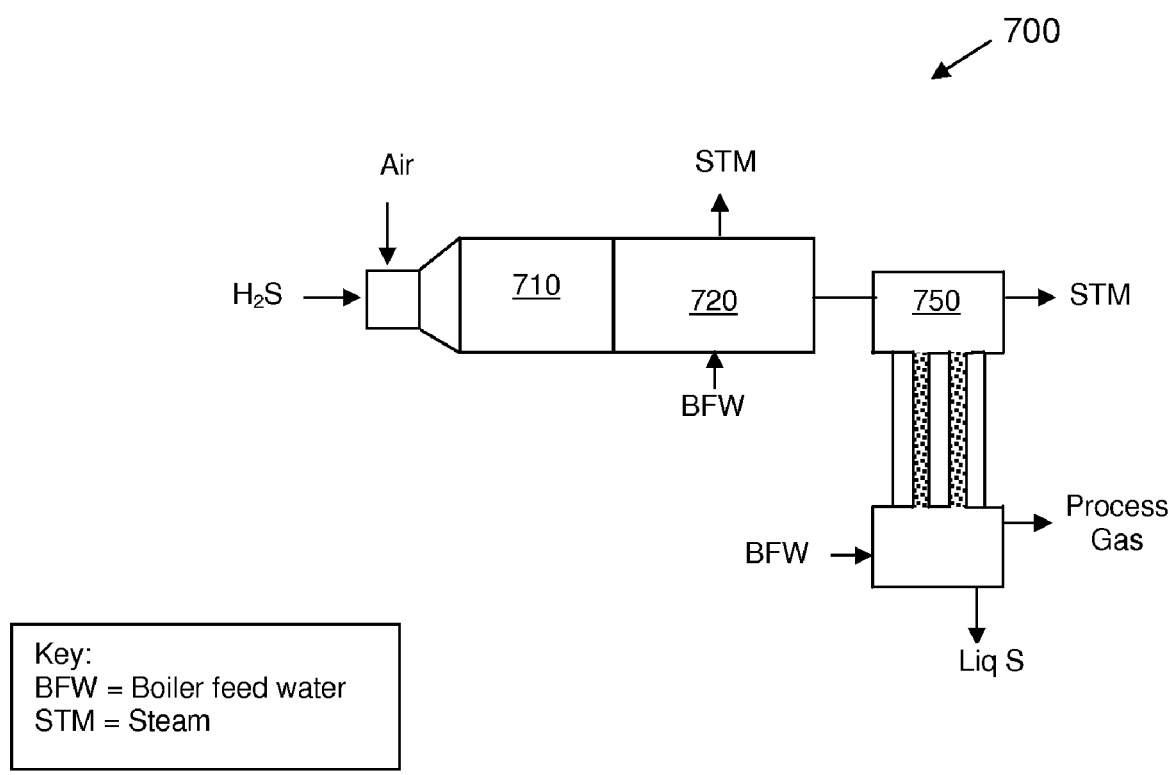
FIG. 11 is a schematic drawing of a Claus sulfur recovery plant employing a heat exchanger containing heat transfer enhancement medium (HTEM) and a tubular Claus catalytic reactor, in accordance with an embodiment of the invention.

In FIG. 11, another design for an improved Claus sulfur recovery plant 700 is schematically shown. A HTEM-containing compact heat exchanger 720 with increased surface area/lower pressure drop, as described above, follows a conventional Claus burner/reaction furnace 710. A tubular Claus catalytic reactor 750 follows the WHB 720. By using a high surface area/low pressure drop heat exchanger and a tubular Claus catalytic reactor, a significant reduction in the size of the heat exchanger and a reduction in the size and number of sequential Claus catalytic reactor units is made possible. Notably, in this plant design the conventional first sulfur condenser is eliminated, and the new TClaus reactor unit immediately follows the waste heat boiler.

XI. Compact Sulfur Recovery Plant with Short-Contact Time Reactor.

Referring now to FIG. 12, a sulfur recovery plant 800 for carrying out a short contact time process for partially oxidizing hydrogen sulfide directly to elemental sulfur is schematically illustrated. Instead of a conventional Claus burner/furnace (as employed in Sections IX and X, above, and FIGS. 10 and 11), a short contact time reactor 810 is joined to a compact HTEM-containing waste heat exchanger 840, which is shown in FIGS. 9 and 12 and is described in Section VI, above. In FIG. 12, a compact HTEM-containing sulfur condenser 850 follows WHB 840, for further cooling the process gas and providing for the removal of liquid sulfur product. HTEM-containing condenser 850 and tubular Claus catalytic reactor 860 are as described in Sections I and II, above.

For processes in which the cooled gases that emerge from tubular Claus catalytic reactor 860 contain an undesirable amount of unreacted $H_2S$ or other sulfur-containing compound, the sulfur recovery plant may further include a heater (like heater 620, 635 or 650 in FIG. 10) and at least one tail gas cleanup unit like TGT unit 665 in FIG. 10. For many situations, the SRU configuration shown in FIG. 12 is varied by eliminating condenser 850 so that the TClaus reactor unit 860 immediately follows WHB 840, analogous to the arrangement shown in FIG. 11.

As used herein the terms "short contact time reactor" (SCTR) and "short contact time process" refer to the conversion of $H_2S$, in the presence of an $O_2$-containing gas, to a product comprising primarily elemental sulfur and water product in a reactor containing a selective solid-phase catalyst bed. The contact time of the gases with the catalyst is limited to control the reaction selectivity. The SCTR supports very fast contact (i.e., millisecond range) of the reactant gases with the catalyst, and fast quench (i.e., less than one second) of the reacted gases. Generally, the reactor must be capable of withstanding the high temperatures resulting from the exothermic oxidation reactions, ranging from the typical feed temperature of less than 300° C. up to 1,000° C. or even up to 1,500° C., marked by a sharp temperature rise at the catalyst-gas interface. To provide a thermal barrier between the high temperature catalyst bed and the low temperature metal walls, the reactor is lined with inert refractory which is capable of withstanding the high temperatures and the large cross-sectional thermal gradients. Preferably enough refractory thickness is provided to bring the gas temperature to less than 300° C. at the refractory-metal wall interface. To selectively carry out the desired partial oxidation reaction, the catalyst bed and the reactor arrangement is preferably designed to minimize the contact time between the feed gases and catalyst particles. This requires the capability of the reactor to operate at very high flow rates or gas hourly space velocities without causing physical damage to the catalyst bed and/or without snuffing the reaction. This also requires mechanically strong catalyst supports to hold the catalyst bed in place. The catalyst bed and reactor arrangement must be capable of operating with minimal pressure drop to allow for high throughput operation. This is generally achieved by designing the catalyst bed with high porosity, smooth, non-powder and attrition-resistant catalyst particles. The catalyst is preferably resistant to sulfur poisoning, and is selective for, or favors, the production of elemental sulfur product rather than $SO_2$ or $SO_3$ products during short contact time operation.

The SCTR is preferably designed so that the gases are able to flow freely with minimal resistance both upstream and downstream of the catalyst bed. The design of a short contact time reactor also minimizes dead spaces where pooling or stagnation of the reactant gases could occur and where undesirable gas-phase side reactions could occur. The reactor's design preferably also provides for rapid mixing of the reactant gases immediately before or at the time of contacting the catalyst. Contact time is calculated as the inverse of gas hourly space velocity (GHSV), and GHSV is calculated as the ratio of combined feed gas volumetric flow rate to the catalyst bed volume. A suitable short contact time reactor and sulfur-forming partial oxidation catalysts are described in U.S. Pat. Nos. 6,800,269 and 6,946,111, the disclosures of which are hereby incorporated herein by reference.

FIG. 9 shows a longitudinal cross-section of an exemplary short contact time reactor, as could be employed in the sulfur recovery plant of FIG. 12. SCTR 530 preferably includes at least one feed injection opening 512, air/$O_2$ inlet 514, a mixing zone 516, a reaction zone 520 and a cooling zone 523. Mixing zone 516 may include a static mixer comprising vanes 519 projecting into inlet 511. Reaction zone 520 preferably includes a pair of thermal radiation barriers or shields 522 positioned immediately upstream and downstream of a selective sulfur-forming partial oxidation catalyst 525, as described above, in a fixed-bed configuration. Radiation barriers 522 are preferably made of porous ceramic or refractory material that can withstand the contemplated operating temperatures and provide some amount of thermal insulation. The reactor walls adjacent to at least the reaction zone 520 and cooling zone 523 of reactor 530 are lined with a refractory material 538. As described in Section VI above, ceramic ferrules 536 are embedded in refractory material 538 and extend through tube sheet 542 and into thermally conductive tubes 544, to protect at least the initial portion of tubes 544 which would otherwise be subjected to temperatures exceeding the tolerance of the metal when the apparatus is used for recovering sulfur from a hydrogen sulfide-containing gas.

The feasibility of operating a temperature controlled Claus catalytic reactor immediately following the sulfur forming partial oxidation stage, without carrying out an intervening step of condensing elemental sulfur, was demonstrated in a laboratory-scale apparatus similar to that shown in FIG. 8, except Claus catalyst was employed inside the jacketed tube instead of HTEM. Tests were carried out with and without the Claus catalyst. A short contact time partial oxidation reaction zone, for converting $H_2S$ and $O_2$ directly to elemental sulfur and water, was assembled in a 0.5 inch diameter×20 inch long quartz tube. On either side of the partial oxidation catalyst were porous ceramic disks. After the $H_2S$ partial oxidation, the reacted gases entered a temperature controlled zone comprising a portion of the quartz tube surrounded by a jacket. In the control tests, the temperature controlled zone was empty, and in the two-catalyst tests, an approximately 3 inch Claus catalyst bed was placed in the temperature controlled zone. Sasol 1-mm gamma alumina spheres with about 170 m²/gram surface area was used to make the Claus catalyst bed. Silicone oil heat transfer fluid (Dowtherm®) was circulated in the jacket for removing heat from the gases leaving the partial oxidation zone. Thermocouples were employed to monitor the temperature of various areas of the apparatus. Air and $H_2S$ were mixed and preheated upstream of the partial oxidation zone. Gas flow rates (sccm) and catalyst bed residence times and temperatures were monitored during the test. All data were collected at a constant Air/$H_2S$ molar ratio of 2.25, and $H_2S$ partial oxidation catalyst bed length of 0.75 inch (1.9 cm). The test conditions and results are shown in Table 6. Surprisingly, it was discovered that the Claus catalyst was not deactivated in the presence of a high level of sulfur vapor. It was found that overall $H_2S$ conversion and sulfur yield increased significantly when both catalysts were employed as described above.

XII. Sulfur Recovery Process Employing a Tubular Claus Reactor in Series Flow.

Figure 13:
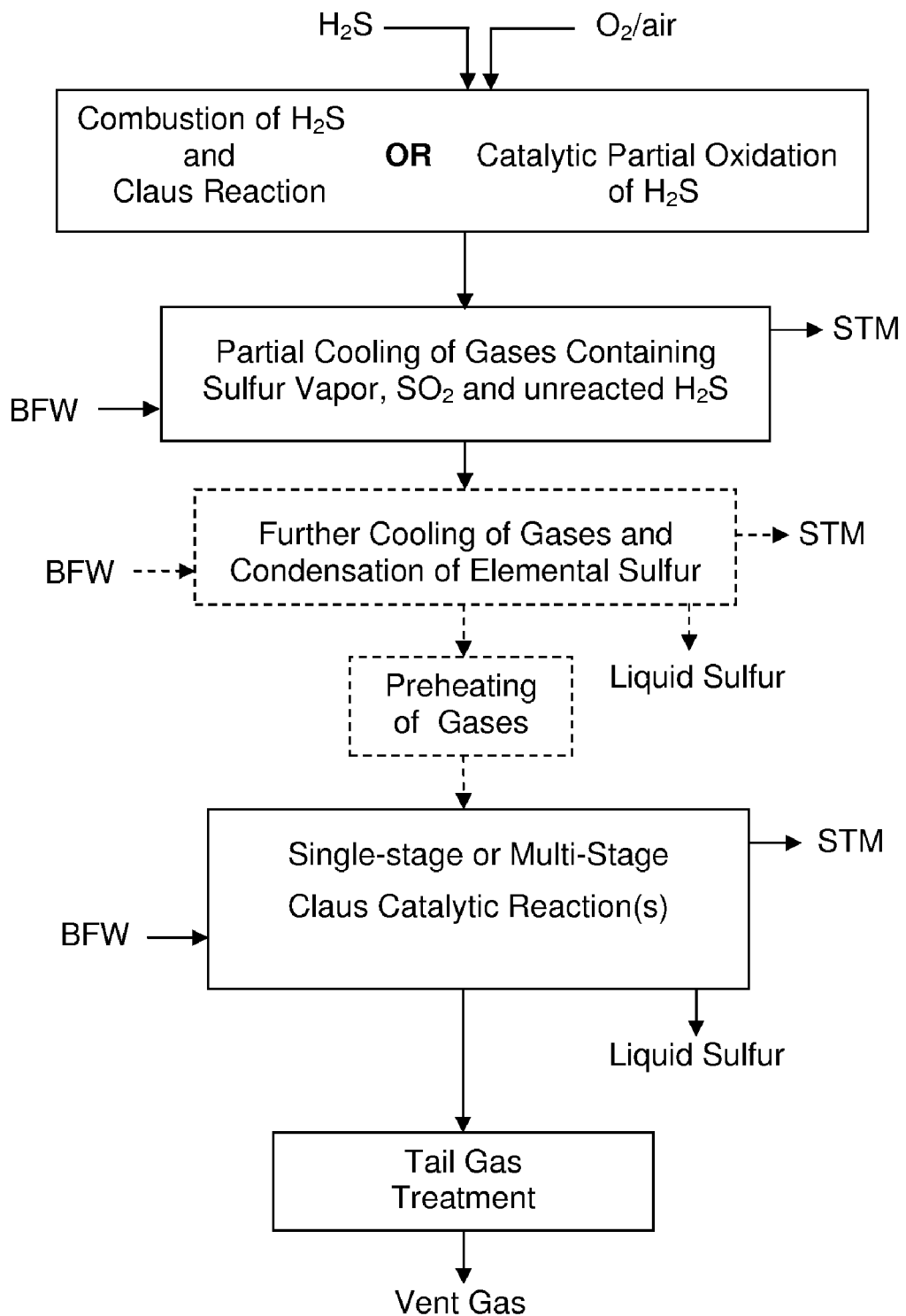
FIG. 13 is a block flow diagram illustrating a sulfur recovery process comprising serial steps including a single- or multi-stage Claus catalytic reaction carried out in a tubular Claus catalytic reactor, in accordance with an embodiment of the invention.

Referring now to the box flow diagram shown in FIG. 13, a single-stage tubular Claus reactor or a multi-stage tubular Claus reactor is employed in place of a conventional Claus catalytic unit in a sulfur recovery plant (as illustrated in FIGS. 6 and 11). Alternatively, the thermal stage of a sulfur recovery process is the catalytic partial oxidation of $H_2S$ carried out in a short contact time reactor like that shown in FIGS. 9 and 12. Reacted gases exiting the thermal stage are partially cooled in a heat exchanger to a temperature above the dewpoint of sulfur, preferably leaving the second stage at a temperature in the range of about 260 to 415° C. As indicated by dashed lines in FIG. 13, in some embodiments, the partially cooled gases containing sulfur vapor are further cooled to a temperature at or below the condensation point of sulfur, preferably in the range of about 125 to 157° C., to condense sulfur. The liquid sulfur is drawn off in the form of liquid sulfur. In preferred embodiments, the need for the initial sulfur condensation step and a separate reheating step is eliminated because of the TClaus reactor. Process gas (leaving the waste heat boiler, or, exiting from the sulfur condenser and preheater, if present), containing primarily unreacted $H_2S$, $SO_2$, sulfur vapor and water vapor, is sent to a single-stage or multi-stage tubular Claus catalytic reactor-heat exchanger, as described in Sections I and II, above, and illustrated in FIGS. 1-5.

A. Using a Vertically-Oriented Single Stage Claus Reactor. Referring to FIGS. 1 and 13, when the sulfur recovery plant comprises a temperature controlled single-stage tubular Claus reactor such as that described in Section I, gas flow through the TClaus reactor unit 1a commences with gases containing $H_2S$ and $SO_2$ entering channel 8 via the inlet channel 4. In addition to $H_2S$ and $SO_2$, the feed gas mixture may in some instances also include $N_2$, $H_2$, $CO_2$ and $H_2O$. A heat transfer fluid (e.g., boiling water) is circulated in the shell space 23 enclosing reactor tube 22 via boiling feed water (BFW) inlet 24 and steam outlet 25. Annular tube sheet 9 separates channel 8 of sulfur separator 2 from the heat transfer fluid in shell space 23 and allows the feed gases to flow into channel 16. Dashed arrows indicate the direction of gas flow. The feed gas mixture flows through the perforations in the innermost tube 13 and contacts the catalyst 5. The Claus reaction takes place rapidly, producing elemental sulfur vapor and releasing heat. The reacted gas (process gas) then flows through the perforated middle tube 18 into outer annulus 20. The closure of annulus 17, at end 12 by tube sheet 9 and at end 14 by cover 19, prevents the process gas from flowing axially in annulus 17. The circulating heat transfer fluid in shell space 23 cools tube 22 causing the condensation of sulfur vapor on the surface of the tube and reducing the temperature of the gas in the annulus between the outer perforated and outside tube. The area of the tube and the temperature of the cooling media are chosen to optimize sulfur condensation and provide flexibility for processing the remaining vapor. For instance, it is desired to keep the temperature of the vapor from the first stage at a temperature that would not allow the sulfur formed in the second stage to condense in the catalyst section of the second stage. The circulating fluid can be a heat transfer oil, pressurized water, boiling water, or any other suitable fluid. Boiling water is preferred to keep the fluid temperature nearly constant.

Referring still to FIGS. 1 and 13, by holding the temperature of the heat transfer fluid below that of the reaction effluent and well below the dew point of the sulfur vapor contained in the effluent gas (i.e., preferably in the range of 125° C. to 157° C.), the heat of reaction and sensible heat is transferred through outer tube 22 to heat the transfer fluid. This causes condensation of the sulfur on the interior of tube 22. Due to the force of gravity acting on the condensed sulfur, sulfur liquid drops or drains to the bottom of annulus 20, and accumulates to the depth necessary to establish a pressure head above the weep holes to prevent the undesired entry of feed gas. From annulus 20, the liquid sulfur drips through weep holes 21 in tube sheet 9 into the feed inlet channel 8. The number and size of the weep holes in tube sheet 9 are selected to cause the accumulation in annulus 20 of a head of liquid sulfur 28 that is greater than the pressure drop between the feed side (i.e., channel 8) and the liquid sulfur collection area (i.e., annulus 20), and thereby prevents pressurized $H_2S$ and $SO_2$ feed gases from entering annulus 20 via weep holes 21. Accumulated liquid sulfur 28 in channel 8 is withdrawn using any suitable technique that is known in the art. The gaseous effluent from the TClaus reactor is then subjected to tail gas treatment (unit 270) to remove residual sulfur vapor and sulfur-containing compounds, and then vented to the atmosphere. Referring briefly to FIG. 6, as indicated by dashed lines, a heater, conventional Claus catalytic reactor 250 and sulfur condenser 260 are included in some variations of the sulfur recovery plant. When this is the case, the gaseous effluent from the TClaus reactor is reheated and then subjected to a conventional Claus catalytic reaction step and sulfur condensation step, prior to tail gas treatment.

B. Using a Horizontal Single-Stage TClaus Reactor. Referring briefly to FIG. 3, in situations in which a horizontally oriented temperature controlled single-stage Claus reactor is employed, the reactor operates in substantially the same manner as the vertically oriented reactor except the direction of gas flow into channel 16 differs and the liquid sulfur exits the sulfur separator/process gas channel at a location that is opposite to the process gas exit 32" in the horizontal reactor 1c. When the horizontally oriented single-stage TClaus reactor 1c is employed instead of the vertically oriented TClaus reactor 1a, condensed sulfur 28 accumulates by gravity flow on the inside of tube 22 and flows axially into product channel 30", where it is withdrawn via outlet 36". The reacted gas exits reactor 1c via process gas outlet 32". In either the vertical or horizontal orientation, the sulfur simply collects on the outer tube walls as it condenses, and then runs down the walls as droplets form and coalesce. The sulfur adheres to the wall and either runs down circumferentially in the horizontal tubes or axially in the vertical tubes. Although not required, preferably the tubes have a slight downward slope toward the outlet in the horizontal unit 1c, to aid gravity flow of the condensed sulfur into sulfur separator 2" and toward the sulfur outlet 36".

C. Using a Multi-Stage TClaus Reactor. Stage 1. Referring now to FIGS. 4 and 13, when a vertically oriented multi-stage Claus reactor-heat exchanger unit (TClaus reactor unit) is employed in a sulfur recovery process, the gas flow is as follows: in Stage 1, the H$_2$S and SO$_2$-containing feed gas flows from inlet 104 into channel 108a, and up through the center openings of tube sheets 109a-b into the central spaces or channels 116a-b of the first pair of reactor assemblies 110a-b. The dashed arrows indicate the direction of flow of the gases. From channels 116a-b, the gas mixture passes radially through the perforated inner tubes 113a-b and into catalyst beds 5a-b, which are held between the respective pairs of perforated tubes 113a/118a and 113b/118b. Similar to the single-stage configuration shown in FIG. 1A, each catalyst-filled annulus is bounded at each end, respectively, by tube sheets 109a, 109b and caps 119a, 109b. As discussed in Subsection A, above, with respect to the single-stage TClaus reactor unit, catalyst support material is preferably placed at each end of the catalyst beds if a significant amount of settling of the catalyst during operation is expected. The temperature of the tube assemblies 110a-f is regulated to maintain the temperature of the Claus catalyst within a temperature range that promotes optimum conversion of H$_2$S and SO$_2$ to elemental sulfur and H$_2$O (i.e., about 200° C. to 340° C.) and at the same time keep the temperature of the outermost tubes (122a, for example) within a range that promotes condensation of sulfur vapor. As described above in Subsection A, with respect to the operation of the single-stage TClaus reactor, the reactant gas mixture flows through the catalyst bed, the Claus reaction takes place, and the reacted gases exit the catalyst bed through the perforated middle tubes. When the gas mixture contacts the catalyst bed, the H$_2$S and SO$_2$ react to form sulfur vapor and water vapor, and also releases heat. The resulting heated process gas flows radially through the perforated middle tubes 118a-b, into the outer annuli 120a-b of assemblies 110a-b. Elemental sulfur condenses on the insides of the respective outer tubes 122a-b, falling as a film or forming drops on the cooled tube walls. The condensed sulfur collects by gravity flow at the bottom of annuli 120a-b where it accumulates due to restriction of the flow from the annulus. The extent of sulfur flow restriction is determined by the number and diameter of drain holes or weep holes 121a, 121b at the bottom of the annuli 109a-b, which are similar to the weep holes 21 shown in FIG. 1C. Preferably the portions of the tubes in contact with the support material are not perforated, because any gas passing through this material will not undergo reaction. Preferably the bottom of the tube in the case of upflow operation is not perforated around the support material to allow a liquid level to build to hold backpressure and to prevent flow through the support. Preferably the catalyst is prevented from becoming saturated with liquid sulfur, as this may tend to cause deactivation. This restriction also allows sulfur liquid to accumulate in the respective annuli to a depth that prevents the flow of feed gas from the inlet channel into the annuli via weep holes 121a-b, and thereby avoids bypassing of the Claus catalyst bed by the feed gas. Reacted or process gas in the outer annuli 120a-b exits the open end of each annulus and enters the process gas channel 130a. Condensed sulfur drips into sulfur separator 102a via weep holes 121a-b. Condensation and separation of the sulfur in the first Claus stage helps propagate the reaction further in the next stage according to Le Chatlier's Principle.

Stage 2. In the next Claus reaction stage (Stage 2), the reacted gases travel down the inner channels (analogous to channels 116a-b), across the catalyst bed and into the outer annuli of the second pair of tube assemblies 10c and 10d. Condensed sulfur 128 from this stage of the reaction drips directly into the sulfur separator 102b. Gas flows axially in this annulus into channel 108b of sulfur separator 102b. Again, condensation and removal of sulfur helps to propagate the reaction in the third stage.

Stage 3. The liquid sulfur remains in the bottom of sulfur separator 102b while the gases in channel 108b rise into the third reactor stage (Stage 3), carried out in the third pair of tube assemblies 110e and 110f. The same flow pattern as the first stage is repeated, and the process gas that is formed emerges into channel 130b and exits via outlet 132. Condensed sulfur accumulates and drips into separator 102b via a plurality of weepholes, as in the first stage.

In conventional modified Claus sulfur recovery processes, reheating of the reacted gases is usually desired before contacting a Claus catalyst bed in order to prevent the accumulation of elemental sulfur on the catalyst surface. Too large an accumulation of sulfur will prevent reactants from reaching the surface of the catalyst, stopping the reaction. Reheating ensures that the final reaction equilibrium temperature is above the dew point of sulfur. For large catalyst beds, operating below the dew point could mean reduced yields, high pressure drop, and excess sulfur in the Claus tail gas. In contrast to conventional Claus catalytic processes, in the present process, intermediate reheat stages are eliminated in the present TClaus reactor design and process. Instead, the heat transfer fluid temperature (e.g., steam pressure) is controlled to provide effective heat transfer and sulfur condensation while keeping the inlet temperatures of the gas optimal, or near optimal, at each stage. Preferably the catalyst effluent is close to or slightly above the sulfur dew point. Since this may lead to excessive sulfur vapor emissions at the last stage, the final stage effluent gas can be directed into a final condenser to recover additional elemental sulfur before the effluent goes on to an incinerator or tail gas unit, as illustrated by the dashed lines in FIG. 6.

Referring to FIG. 4, alternatively, an internal baffle 135 placed on the shell side 123 of the heat exchanger portion of unit 100, between subcooled water inlet 129 and reactor assemblies 110a-d is employed if it is desired to enhance the cooling of the product gas from the last stage or to the last stage product gas to as low a temperature as possible, and to minimize the sulfur vapor content of the gas, thereby improving overall recovery. "Subcooled water" means that the water, or other cooling fluid, is not at its boiling point. For instance, at 67 psia the boiling point of water is 300° F. (149° C.), and a boiler feed water system may operate between about 220-260° F. (104-127° C.). The difference between the BFW temperature and the boiling point in the heat exchanger shell 123 is the amount of subcooling. The reactor assemblies to the left of baffle 135 (away from subcooled water inlet 129) operate at or near the temperature of the boiling water in the shell 123, which is preferably at a higher temperature than the subcooled water from inlet 129 which is used to make up water for steam generation. The colder boiler feed water cools the final reactor stage gases produced in assemblies 110e-f, closest to inlet 129, as discussed above. The baffle inside shell 126 also allows for the subcooled water to be heated, rise, allow any steam generated to escape into the steam outlet, and also causes the preheated water to overflow into the section left of the baffle as make up water for that section.

Referring again to the series flow plant configuration shown in FIG. 6, the effluent from the TClaus reactor 230 is reheated in heater 240, treated in a single conventional Claus catalytic reactor 250, followed by condensation of additional elemental sulfur from the process gas in a final sulfur condenser 260. From the final condenser 260, the effluent is subjected to a tail gas treatment in TGT unit 270 to remove residual sulfur vapor and any sulfur-containing compounds.

The effluent from the TGT unit 270 is vented to the atmosphere. Liquid sulfur is collected from condensers from TClaus reaction unit 230 and condenser 260. Alternatively, the heater 240, Claus reactor 250 and sulfur condenser 260 are omitted, in which case the effluent from TClaus reactor 230 is directly treated in TGT unit 270, as indicated in FIG. 13. If desired, the downward flow multi-stage TClaus reactor shown in FIG. 5, or a horizontally oriented multi-stage TClaus reactor could be substituted for the vertically oriented upward flow unit of FIG. 4. A sulfur recovery process employing only one multi-stage TClaus reactor unit is expected to provide substantially the same sulfur yield and exhaust gas residual sulfur levels as a conventional Claus sulfur recovery plant employing three conventional Claus catalytic units and the same tail gas treatment unit. One multi-stage tubular Claus reactor preferably takes the place of 7-9 pieces of equipment, along with eliminating the interconnecting piping between stages, and, several instrument loops, of a conventional sulfur recovery plant. It can be readily appreciated that, in many instances, using one tubular multi-stage Claus reactor significantly reduces the plot space requirements and the total installed cost of additional sulfur recovery capacity compared to a conventional sulfur recovery installation.

XIII. Sulfur Recovery Process Employing a Tubular Claus Reactor in Parallel Flow.

Figure 14:
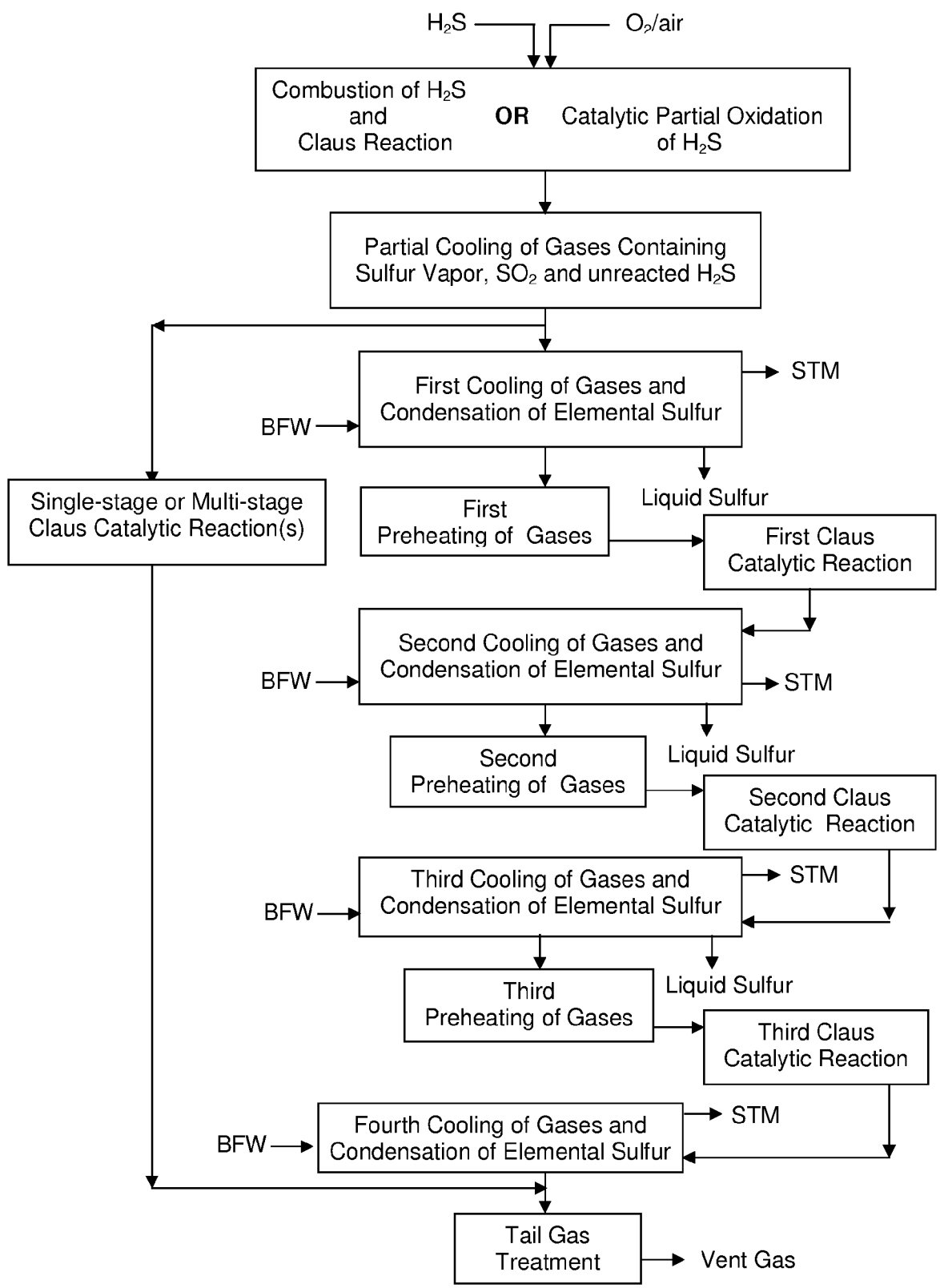
FIG. 14 is a block flow diagram illustrating a Claus sulfur recovery process comprising a series of conventional Claus catalytic conversion steps, and, in parallel, a single- or multistage Claus catalytic reaction carried out in a tubular Claus catalytic reactor, in accordance with an embodiment of the invention.

An economically attractive way of quickly solving the problem of insufficient plant capacity is to simply retrofit an existing modified Claus plant by adding, in parallel, a high-efficiency catalytic Claus reactor that does not contribute appreciably to the pressure drop of the system and at the same time considerably increases the quantity of acid gas that can be efficiently processed over a given period of time. FIG. 14 is a box flow diagram of a Claus sulfur recovery process employing an above-described compact tubular Claus reactor-heat exchanger unit (TClaus reactor) inserted in parallel between the first condenser and the final condenser of an existing Claus plant, as shown in FIG. 7 and described in Section V. Referring to FIGS. 7 and 14, a first portion of the partially cooled gases exiting the waste heat boiler 320 is processed as usual in a succession of sulfur condensers, heaters and conventional Claus reactors. A second portion of the partially cooled gases from waste heat boiler 320 is diverted to a single-stage or multistage TClaus reactor like those described hereinabove. A flow control valve 328 regulates the portion of the gas flow going to the TClaus reactor 370 via conduit 326. A heat transfer fluid is circulated in the shell side of the TClaus reactor to cool the enclosed concentric tubes. The composition and flow rate of the heat transfer fluid is selected to maintain the temperature of the Claus catalyst at a temperature or temperature range that optimally promotes conversion of $H_2S$ and $SO_2$ to elemental sulfur and $H_2O$. One or more temperature sensors in communication with a cooling/heating/flow rate control are placed at one or more points along the catalyst bed and/or on one or more of the concentric tubes 13, 18, 22 (FIG. 1A) or tubes 113a, 118a, 122a, for example (FIG. 5). The fluid can be a heat transfer oil, pressurized water, or boiling water, for example. The latter is preferred to keep the fluid temperature nearly constant.

As shown in FIG. 1A, Claus catalyst is packed in the annulus 17 defined by concentric tubes 13 and 18 in the single-stage configuration, or between tubes 113a and 118a of assembly 110a, and the corresponding tubes if assemblies 110b-f (FIG. 4) of the multi-stage configuration, as described in Sections I and II, above. The catalyst can be individual particles of high surface area ceramic material like gamma alumina, gamma alumina particles deposited on ceramic foam monoliths, or structured ceramic materials coated with particles of gamma alumina, for example. Monoliths and structured packing with high surface area particles are preferred because the pressure drop through these catalyst structures are generally lower than for beds of individual particles. A structured packing with high surface area particles is basically a three-dimensional skeleton that has particles bound to the surface of the skeleton. The spaces where the process gas flows are determined by the structure of the skeleton and not the size or shape of the particles. The size and number of the catalyst-containing tube assemblies, and the total depth and form of the catalyst beds tube, are sized to match the additional capacity needed, and the pressure drop of the existing unit equipment in parallel with the tubular reactor.

Referring now to FIGS. 4, 5, 7 and 14, when either a vertically or horizontally oriented multi-stage Claus catalytic reactor-heat exchanger unit is employed instead of a single-stage TClaus reactor, the gas flow is initially the same as described above in this Section. Upon entering the multi-stage Claus reactor the selected portion of the gas flow commences with Stage 1, followed by Stages 2 and 3, as described in Section XII. The effluent from the TClaus reactor 370 is combined via conduit 376 with the effluent from the final Claus catalytic reactor 410 going to a final sulfur condenser 354. Liquid sulfur is collected from condensers 324, 334, 344, and 354. From the final condenser 354, the effluent is subjected to a tail gas treatment to remove residual sulfur vapor and any sulfur-containing compounds, and the effluent from the final condenser is vented to the atmosphere via exhaust gas outlet 432.

When a parallel Claus catalytic reactor section is employed with an existing Claus sulfur recovery plant, sufficient air blower and Claus burner capacity to handle the additional acid gas needed to be processed is preferably also provided by increasing the size of the overall flow channel. A retrofitted Claus plant such as that shown in FIG. 7, in which the process gas from the waste heat boiler is split, with part of the process gas stream going to a TClaus multi-stage reactor, achieves a significant increase in the quantity of $H_2S$ gas that can be processed. This plant has the potential for much lower cost than adding a parallel train of conventional Claus reheaters/catalyst beds/sulfur condensers because it is much smaller and takes less equipment, interconnecting piping, and instrumentation.

TABLE 1

Claus Catalytic Reaction Kinetics Study

| $H_2S$ (slpm) | $SO_2$ (slpm) | $N_2$ (slpm) | $H_2S$ (mol %) | $SO_2$ (mol %) | $N_2$ (mol %) | Temp. in (° F.) | Temp. out (° F.) | $H_2S$ conv. (slpm) | $SO_2$ in (slpm) | % $H_2S$ (conv) | Mol/min H (reacted) | per gram catalyst |
|---|---|---|---|---|---|---|---|---|---|---|---|---|
| 0.408 | 0.097 | 0.706 | 3.92466 | 12.16403 | 82.86376 | 440 | 527 | 0.375 | 0.291 | 91.804 | 0.016722 | 0.005574 |
| 0.408 | 0.052 | 0.707 | 4.43627 | 7.81981 | 86.31592 | 468 | 522 | 0.372 | 0.250 | 91.094 | 0.016592 | 0.005531 |
| 0.61 | 0.052 | 0.706 | 14.5624 | 1.51521 | 83.1685 | 468 | 573 | 0.486 | 0.256 | 79.735 | 0.021714 | 0.007238 |
| 0.509 | 0.052 | 0.707 | 7.75723 | 3.71164 | 87.14408 | 428 | 557 | 0.446 | 0.253 | 87.636 | 0.019914 | 0.006638 |

TABLE 1-continued

Claus Catalytic Reaction Kinetics Study

| H$_2$S (slpm) | SO$_2$ (slpm) | N$_2$ (slpm) | H$_2$S (mol %) | SO$_2$ (mol %) | N$_2$ (mol %) | Temp. in (° F.) | Temp. out (° F.) | H$_2$S conv. (slpm) | SO$_2$ in (slpm) | % H$_2$S (conv) | Mol/min H (reacted) | per gram catalyst |
|---|---|---|---|---|---|---|---|---|---|---|---|---|
| 0.509 | 0.052 | 0.707 | 7.84165 | 3.84719 | 86.73896 | 492 | 566 | 0.445 | 0.254 | 87.443 | 0.01987 | 0.006623 |
| 0.508 | 0.053 | 0.707 | 8.34017 | 3.7115 | 86.57857 | 555 | 573 | .0440 | 0.250 | 86.593 | 0.019638 | 0.006546 |
| 0.509 | 0.052 | 0.707 | 8.65867 | 3.91455 | 85.99281 | 577 | 587 | 0.438 | 0.251 | 86.014 | 0.019545 | 0.006515 |
| 0.509 | 0.052 | 0.707 | 8.96135 | 4.14323 | 85.48101 | 633 | 596 | 0.435 | 0.252 | 85.439 | 0.019414 | 0.006471 |
| 0.156 | 0.072 | 0.707 | 8.51252 | 9.89075 | 80.64748 | 629 | 379 | 0.081 | 0.127 | 52.163 | 0.003633 | 0.001211 |
| 0.156 | 0.072 | 0.9 | 1.56014 | 5.61706 | 90.4155 | 590 | 376 | 0.140 | 0.126 | 90.045 | 0.006271 | 0.00209 |
| 0.157 | 0.071 | 0.707 | 1.28024 | 6.62562 | 90.06399 | 550 | 372 | 0.147 | 0.125 | 93.599 | 0.00656 | 0.002187 |
| 0.156 | 0.07 | 0.708 | 1.87707 | 6.97001 | 89.02355 | 500 | 356 | 0.141 | 0.126 | 90.431 | 0.006298 | 0.002099 |
| 0.156 | 0.072 | 0.708 | 3.24063 | 7.52276 | 87.48893 | 463 | 346 | 0.130 | 0.126 | 83.189 | 0.005794 | 0.001931 |
| 0.156 | 0.072 | 0.708 | 4.85123 | 8.26215 | 85.20012 | 420 | 328 | 0.116 | 0.127 | 74.158 | 0.005165 | 0.001722 |

TABLE 2

Claus Catalytic Reactor Parameters

| First Claus Reactor | Second Claus Reactor | Third Claus Reactor | | First Claus Reactor | Second Claus Reactor | Third Claus Reactor | |
|---|---|---|---|---|---|---|---|
| 1.31 | 0.26 | 0.13 | lb mol/min | 0.062 | 0.375 | 0.322 | ft$^3$ cat/tube |
| 235 | 1272 | 5086 | lb cat required | 91 | 81 | 376 | tubes required |
| 5.61 | 30.28 | 121.10 | cu. ft cat required | 0.2083333 | 0.2083333 | 0.2083333 | outer OD, ft |
| 0.0885417 | 0.1666667 | 0.15625 | middle tube, OD, ft | 13 | 13 | 13 | ft$^2$ surface |
| 0.0625 | 0.0625 | 0.0625 | inner tube, OD, ft | 1188 | 1057 | 4921 | Total surface |
| 20 | 20 | 20 | length, ft | | | | |

TABLE 3

Sulfur Plant Temperature Indicator Readings

| TT | | Service | Readings | | | | | | | | | Avg. |
|---|---|---|---|---|---|---|---|---|---|---|---|---|
| 3400 | -1 | Amine A.G.K.O. drum | 85.8 | 86.0 | 89.8 | 93.0 | 89.3 | 85.6 | 86.8 | 96.4 | — | 89.1 |
| | -2 | NH3 A.G.K.O. Drum | 144.5 | 140.0 | 145.1 | 146.7 | 148.3 | 144.1 | 146.1 | 158.0 | — | 146.6 |
| | -3 | Combustion air | 247.4 | 245.7 | 246.6 | 249.1 | 249.4 | 242.5 | 248.2 | 254.8 | — | 248.0 |
| | -4 | ECC-WHB Outlet | 608.8 | 608.8 | 609.5 | 603.9 | 592.5 | 602.3 | 582.6 | 610.2 | — | 602.4 |
| | -5 | #1 Condenser Outlet | 285.7 | 287.9 | 288.3 | 290.6 | 283.1 | 288.9 | 274.1 | 286.1 | 286.1 | 285.6 |
| | -6 | #1 Reheater Outlet | 430.1 | 431.0 | 431.2 | 440.0 | 430.4 | 429.5 | 430.8 | 430.8 | 430.8 | 431.6 |
| | -7 | #1 Converter Top | 561.3 | 559.8 | 560.2 | 581.0 | 557.4 | 562.3 | 561.9 | 569.2 | 557.4 | 563.4 |
| | -8 | #1 Converter Top | 543.7 | 542.8 | 542.8 | 554.9 | 542.6 | 542.8 | 547.4 | 543.7 | 550.4 | 545.7 |
| | -9 | #1 Converter Top Mid | 589.6 | 588.7 | 589.4 | 596.9 | 586.8 | 587.4 | 583.6 | 589.8 | 594.3 | 589.6 |
| | -10 | #1 Converter Top Mid | 590.0 | 589.4 | 590.0 | 597.9 | 587.4 | 587.9 | 584.2 | 590.4 | 595.1 | 590.3 |
| | -11 | #1 Converter Btm Mid | 593.6 | 592.4 | 592.3 | 599.6 | 590.6 | 590.6 | 587.2 | 592.6 | 597.3 | 593.0 |
| | -12 | #1 Converter Btm Mid | 593.0 | 592.3 | 592.3 | 599.2 | 590.6 | 590.2 | 587.2 | 592.6 | 597.9 | 592.8 |
| | -13 | #1 Converter Btm | 592.6 | 592.6 | 591.5 | 599.2 | 591.7 | 590.2 | 587.9 | 593.6 | 596.4 | 592.8 |
| | -14 | #1 Converter Btm | 593.9 | 593.0 | 592.4 | 599.8 | 591.7 | 591.7 | 588.3 | 592.6 | 598.3 | 593.5 |
| 3408 | | #1 Converter Out | 573.7 | 572.8 | 582.1 | 573.5 | 572.2 | 564.5 | 574.3 | 579.5 | 575.6 | 574.2 |
| 3400 | -15 | #2 Condenser Out | 293.9 | 294.3 | 295.3 | 293.8 | 289.4 | 286.4 | 294.5 | 291.5 | 292.3 | 292.4 |
| | -16 | #2 Reheater Out | 414.5 | 415.3 | 433.8 | 414.5 | 414.1 | 413.6 | 414.5 | 424.4 | 414.1 | 417.6 |
| | -17 | #2 Converter Top | 425.2 | 424.8 | 443.0 | 425.9 | 431.2 | 425.8 | 424.8 | 438.5 | 424.6 | 429.3 |
| | -18 | #2 Converter Top | 426.9 | 425.9 | 444.7 | 427.4 | 434.6 | 427.4 | 426.5 | 439.6 | 425.8 | 431.0 |
| | -19 | #2 Converter Top Mid | 437.4 | 434.4 | 454.8 | 440.8 | 446.4 | 437.8 | 439.1 | 455.4 | 436.4 | 442.5 |
| | -20 | #2 Converter Top Mid | 437.4 | 414.7 | 450.9 | 437.8 | 449.4 | 438.7 | 438.9 | 454.6 | 433.8 | 439.2 |
| | -21 | #2 Converter Btm Mid | 440.2 | 440.2 | 458.9 | 440.2 | 449.2 | 439.4 | 441.5 | 458.4 | 441.3 | 445.5 |
| | -22 | #2 Converter Btm Mid | 434.0 | 444.33 | 459.5 | 441.5 | 448.6 | 443.2 | 442.3 | 457.6 | 441.9 | 445.9 |
| | -23 | #2 Converter Btm | 442.4 | 442.1 | 460.8 | 440.2 | 451.3 | 440.6 | 443.9 | 460.3 | 443.8 | 447.3 |
| | -24 | #2 Converter Btm | 443.0 | 443.0 | 461.4 | 440.8 | 452.4 | 141.5 | 444.7 | 461.0 | 444.5 | 447.9 |
| 3409 | | #2 Converter Out | 434.4 | 434.9 | 452.6 | 432.5 | 443.2 | 432.5 | 437.2 | 452.0 | 436.4 | 439.5 |
| 3400 | -25 | #3 Condenser Out | 286.2 | 286.7 | 289.4 | 287.9 | 280.8 | 279.1 | 285.3 | 284.6 | 282.8 | 284.8 |
| | -26 | #3 Reheater Out | 418.4 | 419.0 | 437.4 | 419.0 | 421.3 | 417.7 | 419.4 | 428.9 | 417.9 | 422.1 |
| | -27 | #3 Converter Top | 417.7 | 417.5 | 416.9 | 436.4 | 418.3 | 426.3 | 417.7 | 416.6 | 432.1 | 422.2 |
| | -28 | #3 Converter Top | 418.4 | 418.4 | 417.7 | 437.0 | 418.4 | 428.9 | 418.4 | 416.9 | 432.5 | 422.7 |
| | -29 | #3 Converter Btm | 422.2 | 420.7 | 420.5 | 440.0 | 419.8 | 430.1 | 419.0 | 420.9 | 439.4 | 425.8 |
| | -30 | #3 Converter Btm | 423.1 | 421.1 | 420.9 | 440.8 | 420.3 | 431.2 | 419.8 | 421.6 | 440.6 | 426.6 |

TABLE 4

Temperature Measurements Along the Axis of the Cooling Zone of a Short Contact Time Reactor (Bare Tube)

| Reactor Out (° F.) | Temp. at 2" (° F.) | Oil Temp. (° F.) | $H_2S$ (slpm) | Vol. Ratio Air/$H_2S$ | LMTD (° F.) | Duty (BTU/hr) | Area (Sq. ft.) | Overall U (BTU/hr/ft²/° F.) | ΔP (psig) |
|---|---|---|---|---|---|---|---|---|---|
| 1108 | 778 | 302 | 750 | 2.4 | 627 | 58.4 | 0.02182 | 4.27 | 1.61 |
| 1025 | 720 | 302 | 750 | 2 | 557 | 42.0 | 0.02182 | 3.46 | 1.24 |
| 1106 | 765 | 302 | 750 | 2.4 | 618 | 60.3 | 0.02182 | 4.47 | 1.49 |
| 1168 | 800 | 302 | 750 | 2.8 | 665 | 80.9 | 0.02182 | 5.58 | 1.62 |
| 932 | 618 | 302 | 450 | 2.8 | 455 | 27.4 | 0.02182 | 2.76 | 0.77 |
| 885 | 584 | 302 | 450 | 2.4 | 414 | 23.5 | 0.02182 | 2.59 | 0.68 |
| 829 | 540 | 302 | 450 | 2 | 364 | 19.8 | 0.02182 | 2.50 | 0.58 |
| 1333 | 910 | 302 | 1250 | 2 | 801 | 179.8 | 0.02182 | 10.29 | 1.50 |
| 1383 | 963 | 302 | 1250 | 2.4 | 854 | 188.0 | 0.02182 | 10.09 | 1.72 |
| 1520 | 1008 | 302 | 1250 | 2.8 | 939 | 215.3 | 0.02182 | 10.51 | 1.97 |
| 1689 | 1078 | 302 | 1650 | 2.8 | 1052 | 307.8 | 0.02182 | 13.41 | 1.99 |
| 1651 | 1044 | 302 | 1650 | 2.4 | 1015 | 300.7 | 0.02182 | 13.58 | 1.46 |
| 1541 | 1005 | 302 | 1650 | 2 | 946 | 267.8 | 0.02182 | 12.98 | 1.14 |

TABLE 5

Temperature Measurements Along the Axis of the Cooling Zone of a Short Contact Time Reactor (2" Quartz Beads Inside Tube)

| Reactor Out (° F.) | Temp. at 2" (° F.) | Oil Temp. (° F.) | $H_2S$ (slpm) | Vol. Ratio Air/$H_2S$ | LMTD (° F.) | Duty (BTU/hr) | Area (Sq. ft.) | Overall U (BTU/hr/ft²/° F.) | ΔP (psig) |
|---|---|---|---|---|---|---|---|---|---|
| 1108 | 361 | 302 | 750 | 2 | 253 | 58.4 | 0.02182 | 18.85 | 0.95 |
| 1025 | 353 | 302 | 750 | 2.4 | 292 | 42.0 | 0.02182 | 20.47 | 1.14 |
| 1168 | 381 | 302 | 750 | 2.8 | 329 | 80.9 | 0.02182 | 16.19 | 1.33 |
| 932 | 297 | 266 | 450 | 2.8 | 207 | 27.4 | 0.02182 | 12.33 | 0.76 |
| 885 | 284 | 266 | 450 | 2.4 | 170 | 23.5 | 0.02182 | 15.50 | 0.67 |
| 829 | 277 | 266 | 450 | 2 | 140 | 19.8 | 0.02182 | 16.04 | 0.59 |
| 1333 | 446 | 302 | 1250 | 2 | 451 | 179.8 | 0.02182 | 30.10 | 1.55 |
| 1383 | 482 | 302 | 1250 | 2.4 | 503 | 188.0 | 0.02182 | 28.31 | 1.89 |
| 1520 | 517 | 302 | 1250 | 2.8 | 578 | 215.3 | 0.02182 | 26.76 | 2.18 |
| 1689 | 576 | 302 | 1650 | 2.8 | 686 | 307.8 | 0.02182 | 32.52 | 2.64 |
| 1651 | 566 | 302 | 1650 | 2.4 | 665 | 300.7 | 0.02182 | 31.10 | 2.12 |
| 1541 | 539 | 302 | 1650 | 2 | 606 | 267.8 | 0.02182 | 29.91 | 1.68 |

TABLE 6

$H_2S$ Catalytic Partial Oxidation Reaction With and Without Claus Catalytic Reaction

| $H_2S$ Flowrate (sccm) | Total Flowrate (sccm) | $H_2S$ POX Catalyst Bed GHSV (1/h) | $H_2S$ POX Catalyst Bed Residence Time (m sec) | WITHOUT CLAUS CATALYST $H_2S$ Conv. (%) | WITHOUT CLAUS CATALYST S Yield (%) | WITHOUT CLAUS CATALYST $SO_2$ Yield (%) | WITH CLAUS CATALYST Claus Catalyst Bed GHSV (1/h) | WITH CLAUS CATALYST Claus Catalyst Bed Residence Time (m sec) | WITH CLAUS CATALYST $H_2S$ Conv. (%) | WITH CLAUS CATALYST S Yield (%) | WITH CLAUS CATALYST $SO_2$ Yield (%) |
|---|---|---|---|---|---|---|---|---|---|---|---|
| 750 | 2437.5 | 121,208 | 29.7 | 80.49 | 72.06 | 8.43 | 30,302 | 118.8 | 89.35 | 83.91 | 5.44 |
| 850 | 2762.5 | 137,369 | 26.2 | 81.24 | 72.86 | 8.38 | 34,342 | 104.8 | 88.30 | 82.52 | 5.78 |
| 950 | 3087.5 | 153,530 | 23.5 | 81.76 | 73.32 | 8.44 | 38,383 | 93.8 | 88.50 | 82.73 | 5.76 |
| 1050 | 3412.5 | 169,691 | 21.2 | 82.58 | 74.14 | 8.44 | 42,423 | 84.9 | 88.95 | 83.14 | 5.81 |
| 1150 | 3737.5 | 185,852 | 19.4 | 82.74 | 74.00 | 8.74 | 46,463 | 77.5 | 89.20 | 83.43 | 5.77 |
| 1250 | 4062.5 | 202,013 | 17.8 | 83.52 | 74.89 | 8.62 | 50,503 | 71.3 | 89.72 | 83.42 | 6.31 |

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. For instance, in view of the representative examples, it can be readily appreciated that single-stage and multi-stage tubular Claus catalytic reactors, and heat exchangers containing HTEM-filled tubes, can be combined in a variety of different combinations than those expressly exemplified. Accordingly, the scope of protection is not limited by the description set out above, but is only limited by the claims which follow, that scope including all equivalents of the subject matter of the claims. All patents, patent applications and publications cited herein are hereby incorporated herein by reference, to the extent that they describe materials, methods or other details supplementary to those set forth herein.

What is claimed is:

1. A tubular Claus catalytic reaction unit for converting $SO_2$ and $H_2S$ to elemental sulfur and water, said reaction unit comprising:
    a sulfur separator comprising a reactant gas channel and a process gas channel, said sulfur separator having a liquid sulfur outlet and at least one liquid sulfur inlet, said process gas channel having a process gas outlet;
    at least one concentric tubular reactor assembly disposed between said reactant gas channel and said process gas channel, wherein the concentric tubular assembly comprises:
        an annular Claus catalytic reaction zone in fluid communication with said reactant gas channel,
        an annular sulfur condensation zone adjacent to and in fluid communication with said catalytic reaction zone, for receiving reacted gases from said reaction zone and for condensing and collecting sulfur, said condensation zone comprising a process gas outlet in fluid communication with said process gas channel and said sulfur separator; and
        a temperature control zone in thermal communication with said condensation zone.

2. The Claus catalytic reaction unit of claim 1 wherein each said concentric tubular reactor assembly comprises:
    first and second ends;
    a group of concentric tubes extending between said first and second ends, and comprising:
        a perforated inner tube having an interior gas channel,
        a perforated middle tube, and
        a non-perforated outer tube,
        wherein said annular catalytic reaction zone is disposed between said inner and middle tubes; and
        wherein said annular sulfur condensation zone is disposed between said middle and outer tubes, said condensation zone having at least one liquid sulfur outlet and a process gas outlet;
    wherein said reactant gas channel adjoins said first end, is in fluid communication with said interior channel, and
    wherein said process gas channel adjoins said second end, is in fluid communication with said sulfur condensation zone, and comprises at least one process gas outlet, and
    wherein said temperature control zone comprises:
        a first end adjacent to said reactant gas channel,
        a second end adjacent to said process gas channel,
        a shell comprising an interior fluid space surrounding at least a portion of each said outer tube,
        a heat transfer fluid inlet, and
        a heat transfer fluid outlet.

3. The unit of claim 2 configured in a vertical orientation with respect to the axis of the concentric tubes.

4. The unit of claim 2 configured in a horizontal orientation with respect to the axis of the concentric tubes.

5. The unit of claim 2 wherein each said reactor assembly comprises a removable closure attached to the inner and middle tubes at each said reactor assembly's second end.

6. The unit of claim 1 comprising a plurality of said concentric tubular reactor assemblies, wherein said reactant gas channel comprises a first reactant gas channel, said process gas channel comprises a third process gas channel having a process gas outlet, and said unit comprises at least a first pair of said concentric tube assemblies configured for receiving reactant gas from said first reactant gas channel and emitting process gas into a first process gas channel that is adjacent to said third process gas channel.

7. The unit of claim 6 wherein said unit further comprises at least a second pair of concentric tube assemblies configured for receiving process gas from said first process gas channel and for emitting process gas into a second process gas channel that is adjacent to said first reactant gas channel and comprises a liquid sulfur outlet.

8. The unit of claim 7 wherein said unit further comprises at least a third pair of concentric tube assemblies configured for receiving process gas from said second process gas channel and for emitting process gas into said third process gas channel.

9. A Claus sulfur recovery plant comprising:
    a thermal zone for producing a gaseous effluent comprising elemental sulfur, $SO_2$ and unreacted $H_2S$;
    at least one heat exchanger; and
    at least one tubular Claus catalytic reaction unit in accordance with claim 1, for receiving said gaseous effluent and converting $SO_2$ and unreacted $H_2S$ to elemental sulfur and water,
    wherein a first said heat exchanger is disposed between said thermal zone and one said tubular Claus catalytic reaction unit, for partially cooling said gaseous effluent from said thermal zone.

10. The Claus sulfur recovery plant of claim 9 wherein said at least one heat exchanger includes a first heat exchanger comprising:
    a plurality of tubes, wherein each said tube contains a heat transfer enhancement medium,
    a liquid sulfur outlet, and
    a process gas outlet in fluid communication with said tubular Claus catalytic reaction unit.

11. The sulfur recovery plant of claim 10 wherein said heat exchanger containing said heat transfer enhancement medium has a heat transfer coefficient at least 2.5 fold greater than the heat transfer coefficient of an identical heat exchanger without said heat transfer enhancement medium.

12. The sulfur recovery plant of claim 9 wherein at least one said heat exchanger comprises a second heat exchanger consisting of a sulfur condenser which includes a liquid sulfur outlet and a plurality of tubes containing heat transfer enhancement medium.

13. In a Claus sulfur recovery plant comprising a thermal zone followed by a waste heat exchanger containing a plurality of cooling tubes, and at least one Claus catalytic reaction unit in series flow arrangement with said waste heat exchanger, each said Claus catalytic reaction unit comprising a heater, Claus catalytic reactor and sulfur condenser, the improvement comprising:
    (a) insertion of the tubular Claus catalytic reaction unit as defined in claim 1 in parallel flow arrangement with said at least one Claus catalytic reaction unit; and/or
    (b) replacement of at least one Claus catalytic reaction unit with at least one tubular Claus catalytic reaction unit according to claim 1.

14. A process for producing elemental sulfur from a feed gas stream containing hydrogen sulfide and sulfur dioxide, said process comprising:
    (a) introducing a feed gas stream comprising hydrogen sulfide and sulfur dioxide into the Claus catalytic reaction unit according to claim 2;
    (b) circulating a heat transfer fluid in said temperature control zone to maintain the temperature of the heat transfer fluid in the range of about 125° C. to about 157° C.;

(c) contacting the feed gas stream with said Claus catalyst in said catalytic reaction zone, causing the hydrogen sulfide and sulfur dioxide to react, forming a process gas stream comprising elemental sulfur and water; and (d) cooling said process gas stream to cause the condensation of at least a portion of the elemental sulfur in said process gas stream, whereby, aided by the force of gravity, liquid sulfur collects in said sulfur condensation zone and seep into said reactant gas channel by way of said plurality of liquid sulfur outlets.

15. The process of claim 14 wherein, in step (b), circulating said heat transfer fluid in said temperature control zone comprises maintaining the temperature of said process gas stream from step (c) in the range of about 125° C. to about 157° C.

16. The process of claim 14, wherein said Claus catalytic reaction unit is a multi-stage Claus catalytic reaction unit wherein said reactant gas channel comprises a first reactant gas channel, said process gas channel comprises a third process gas channel having a process gas outlet, and said unit comprises:

at least a first group of said concentric tubular reactor assemblies configured for receiving reactant gas from said first reactant gas channel and emitting process gas into a first process gas channel that is adjacent to said third process gas channel, at least a second group of concentric tubular reactor assemblies configured for receiving process gas from said first process gas channel and for emitting process gas into a second process gas channel that is adjacent to said first reactant gas channel and comprises a liquid sulfur outlet, and at least a third group of concentric tubular reactor assemblies configured for receiving process gas from said second process gas channel and for emitting process gas into said third process gas channel; and step (a) comprises:

($a_1$) passing said feed gas stream into said at least a first group of concentric tubular reactor assemblies, whereby a first reacted gas mixture comprising elemental sulfur, unreacted $H_2S$ and unreacted $SO_2$ is formed and a first quantity of elemental sulfur is condensed, and the resulting first stage process gas is emitted into said first process gas channel;

($a_2$) passing said first process gas into said at least a second group of concentric tubular reactor assemblies, whereby a second reacted gas mixture comprising elemental sulfur, unreacted $H_2S$ and unreacted $SO_2$ is formed and a second quantity of elemental sulfur is condensed, and the resulting second stage process gas is emitted into said second process gas channel;

($a_3$) passing said second process gas into said at least a third group of concentric tubular reactor assemblies, whereby a third reacted gas mixture comprising elemental sulfur, unreacted $H_2S$ and unreacted $SO_2$ is formed and a third quantity of elemental sulfur is condensed, and the resulting third stage process gas is emitted into said third process gas channel; and ($a_4$) collecting said condensed sulfur.

17. The process of claim 16, wherein, in step (b), circulating said heat transfer fluid in said temperature control zone comprises contacting each said non-perforated outer tube of each said reactor assembly in said multi-stage Claus catalytic reaction unit with said heat transfer fluid.

18. The process of claim 16, wherein step (d) comprises cooling said first, second and third process gas streams from steps ($a_1$-$a_3$) in the respective sulfur condensation zones, causing liquid sulfur to collect in said respective sulfur condensation zones.

19. The process of claim 18, wherein said heat transfer fluid inlet is disposed nearer to the last group of concentric tubular reactor assemblies than to the earlier groups of reactor assemblies, said interior fluid space comprises a baffle disposed between said last group of reactor assemblies and said earlier groups of reactor assemblies, and said heat transfer fluid comprises water, and step (d) further comprises introducing pressurized water into said fluid inlet, wherein said pressurized water is at a temperature in the range of about 100° C. to about 125° C., to cool the process gas and condensed sulfur from the last group of reactor assemblies to a lower temperature than that of the process gas and condensed sulfur from the earlier reactor assemblies, whereby the overall sulfur recovery of the process is enhanced.

20. A process for recovering elemental sulfur from a gas stream containing hydrogen sulfide, the method comprising:

a thermal stage comprising passing a feed gas stream comprising hydrogen sulfide and an $O_2$-containing gas through a Claus burner/furnace, or passing said feed gas stream through a catalytic partial oxidation reactor, to yield a process gas stream comprising elemental sulfur, water, $SO_2$, and unreacted $H_2S$, if any;

partially cooling said process gas stream;

introducing at least a first portion of said partially cooled oxidized gas stream into a tubular Claus catalytic reaction unit according to claim 2, circulating said heat transfer fluid in said temperature control zone at a temperature or temperature range that maintains the temperature of the gases at about the dew point of sulfur, whereby liquid sulfur forms in each said sulfur condensation zone and a second process gas stream is produced.

21. The process of claim 20 further comprising:

introducing a second portion of said partially cooled process gas stream into a first sulfur condenser, whereby additional liquid sulfur is formed and a third process gas stream is produced;

subjecting said third process gas stream sequentially to at least one other Claus catalytic reaction unit, different than said Claus catalytic reaction unit of claim 2, wherein each said other Claus catalytic reaction unit comprising a heater, Claus catalytic reactor, and sulfur condenser, thereby forming additional liquid sulfur and producing a fourth process gas stream;

recovering said liquid sulfur;

combining said second and fourth process gas streams; and subjecting said combined process gas stream to a tail gas treatment to remove residual sulfur-containing compounds, to produce an exhaust gas.

22. The process of claim 21 wherein at least one said sulfur condenser comprises a plurality of cooling tubes containing a heat transfer enhancement medium.

23. The process of claim 20 wherein said thermal stage comprises passing said feed gas stream through a short contact time catalytic partial oxidation reactor at a gas hourly space velocity of at least 20,000 $h^{-1}$, wherein said short contact time reactor comprises a mixing zone, a reaction zone, and a cooling zone.

* * * * *